(12) United States Patent
Naso et al.

(10) Patent No.: US 8,275,926 B2
(45) Date of Patent: *Sep. 25, 2012

(54) FILTERED REGISTER ARCHITECTURE TO GENERATE ACTUATOR SIGNALS

(75) Inventors: Giovanni Naso, Frosinone (IT); Stefano Donnola, Spoleto (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,657

(22) Filed: Apr. 25, 2011

(65) Prior Publication Data

US 2011/0208902 A1    Aug. 25, 2011

Related U.S. Application Data

(60) Continuation of application No. 12/619,364, filed on Nov. 16, 2009, now Pat. No. 7,934,048, which is a division of application No. 11/642,038, filed on Dec. 19, 2006, now Pat. No. 7,620,859.

(30) Foreign Application Priority Data

Oct. 6, 2006  (IT) .............................. TO2006A0719

(51) Int. Cl.
*G06F 12/00* (2006.01)
(52) U.S. Cl. .................................. 711/100; 365/230.02
(58) Field of Classification Search .................. 711/100; 365/230.02
See application file for complete search history.

(56) References Cited

U.S. PATENT DOCUMENTS

| 5,487,051 | A | * | 1/1996 | Providenza et al. | ...... 365/233.14 |
| 5,748,939 | A | | 5/1998 | Rozman et al. | |
| 5,850,509 | A | | 12/1998 | Fandrich et al. | |
| 6,108,756 | A | | 8/2000 | Miller et al. | |
| 6,353,571 | B1 | | 3/2002 | Norman et al. | |
| 6,453,434 | B2 | * | 9/2002 | Delp et al. | ..................... 714/718 |
| 7,058,799 | B2 | * | 6/2006 | Johnson | ....................... 713/400 |
| 7,061,941 | B1 | * | 6/2006 | Zheng | ........................... 370/535 |
| 7,620,859 | B2 | | 11/2009 | Naso et al. | |
| 2002/0154548 | A1 | * | 10/2002 | Mick | ........................ 365/189.01 |
| 2003/0123320 | A1 | * | 7/2003 | Wright et al. | ................. 365/233 |
| 2008/0086604 | A1 | | 4/2008 | Naso et al. | |
| 2010/0064188 | A1 | | 3/2010 | Naso et al. | |

* cited by examiner

*Primary Examiner* — Hashem Farrokh
(74) *Attorney, Agent, or Firm* — Schwegmen, Lundberg & Woessner, P.A.

(57) ABSTRACT

In various embodiments, apparatus and systems, as well as methods, may include an enhanced register to provide actuator signals to a memory array, the enhanced register including a first memory device including an first enable input, a first data input coupled to a register data input, and first memory device output, the first memory device output to couple to the memory array, and the enhances register to include a second memory device including a second enable input, a second data input coupled to the register data input, and a second memory device output, wherein the second memory device output provides a first output signal indicating when one or more of the actuator signals from the first memory device output are to be coupled to the register data input.

17 Claims, 16 Drawing Sheets

FILTERED REGISTER ARCHITECTURE TO GENERATE ACTUATOR SIGNALS

RELATED APPLICATIONS

This application is a continuation of U.S. application Ser. No. 12/619,364, filed Nov. 16, 2009 now U.S. Pat. No. 7,934,048, which is a divisional of U.S. application Ser. No. 11/642,038, filed Dec. 19, 2006, now issued as U.S. Pat. No. 7,620,859, which claims priority under 35 U.S.C. 119 from Italian Application No. TO2006A000719, filed Oct. 6, 2006, which applications are incorporated herein by reference in their entirety.

FIELD OF THE INVENTION

The present invention relates generally to memory devices, and in particular the present invention relates to a register architecture used in conjunction with memory devices.

BACKGROUND OF THE INVENTION

Flash memory devices have developed into a popular source of non-volatile memory for a wide range of electronic applications. Flash memory devices typically use a one-transistor memory cell that allows for high memory densities, high reliability, and low power consumption. Common uses for flash memory include portable computers, personal digital assistants (PDAs), digital cameras, and cellular telephones. Program code, system data such as a basic input/output system (BIOS), and other firmware can typically be stored in flash memory devices.

Flash memory operations such as erase and program are accomplished using complex algorithms composed of many different steps and requiring control over timing, counter, and analog voltages. For example, a program operation is typically a loop of program pulses and program verifies executed so that the desired value is written and verified with an appropriate voltage margin. The control of the memory portion of a flash memory, referred to as the memory array, is accomplished by controlling one or more actuator signals coupled to the memory array.

A circuit typically referred to as an algorithm controller is designed to manage the execution of the various complex steps of memory operations, including controlling the one or more actuator signals. The algorithm controller must track the steps of the operation even when one operation is suspended in order to service a higher priority operation. The algorithm controller must properly manage the interrupt and then resume the original operation at an appropriate point to allow the suspended operation to be correctly completed.

While the algorithm controller executes algorithms, referred to as "user algorithms," it is often necessary or desirable to operate the flash memory in a different mode, for example a test mode, wherein operations of the flash memory may be controlled by an external tester. In such a mode, referred to as a test mode, one or more setting may be applied to each of the actuator signals controlling the memory array. However, upon exiting the test mode, the setting provided to any of the one or more actuator signals will not be retained, as the user algorithms completely re-writes the setting of the actuator signals based on the user algorithms executed by the algorithm controller during the subsequent user mode.

DETAILED DESCRIPTION

Figure 1:
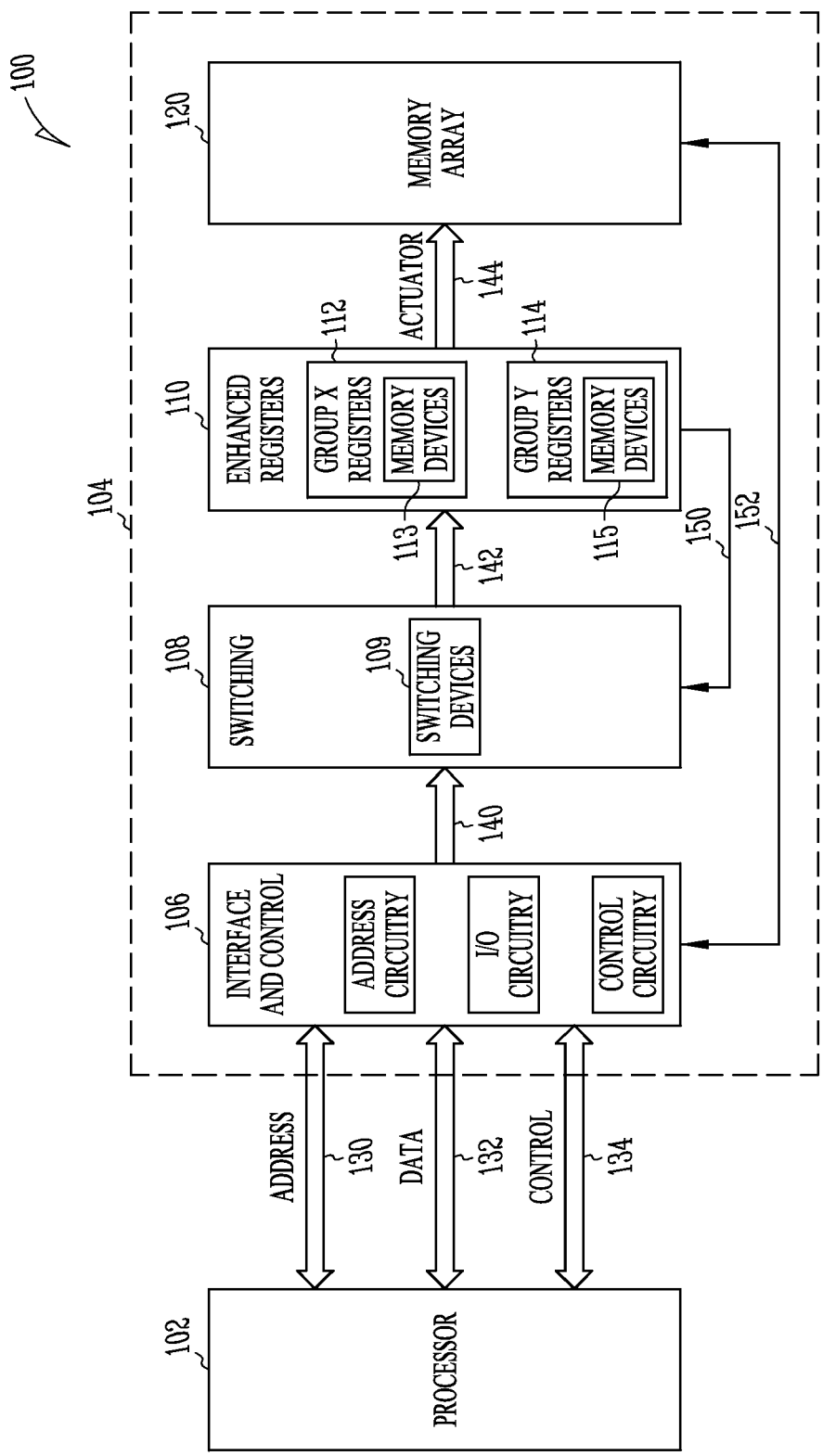
FIG. 1 illustrates a functional block diagram of an example embodiment of a register architecture.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

One or more embodiments of the present invention include enhanced registers. Enhanced registers are registers that include a filter register and filtering, as described in further detail below. In addition, one or more embodiments of the present invention include switching devices and logic circuitry as part of or associated with the control and operation of the filter register, as described in further detail below.

FIG. 1 illustrates a functional block diagram of an embodiment of a register architecture 100. Register architecture 100 includes memory device 104. In various embodiments, the memory device 104 is coupled to a processor 102 to form part of an electronic system. The memory device 104 has been simplified in FIG. 1 to focus on features of the memory that are helpful in understanding the various embodiments described herein.

Processor 102 is coupled to memory device 104. Memory device 104 includes interface and control block 106, switching block 108, and enhanced registers included in enhanced registers block 110.

Processor 102 is coupled to memory device 104 through address lines 130, data lines 132, and control lines 134. Although address lines 130, data lines 132, and control lines 134 are each shown as a single line, these sets of lines are not limited to a particular type of connection, and are not limited to a single conductor or a single transmission line. One or more of address lines 130, data lines 132, and control lines 134 may consist of multiple conductors or multiple transmission lines.

In FIG. 1, address lines 130, data lines 132, and control lines 134 are shown as coupling to the interface and control block 106. However, embodiments are not limited to lines from the processor being connected only to the interface and control block 106. In various embodiments, one or more signals provided on address lines 130, data lines 132, and control lines 134 may be coupled to other blocks in memory device 104, including but not limited to switching block 108. For example, in various embodiments, data from data lines 132 is coupled to switching block 108, as explained in further detail below.

In an embodiment, address lines 130 are used to send addresses from processor 102 to memory device 104. Addresses are not limited to any particular type of addresses, and may include address associated with each of the enhanced registers in enhanced registers block 110. Address lines 130 may transmit addresses in parallel using a plurality of address lines included in address lines 130. Address lines 130 may transmit addresses as serial data. Address lines 130 may include any type of transmission medium suitable for transmitting address data.

In an embodiment, data lines 132 are used to send data from processor 102 to memory device 104. Data is not limited to any particular type of data. In one embodiment, data includes settings to be stored in the one or more registers included in enhanced registers block 110. In one or ore embodiments, data may include data to be written to memory array 120. In one or more embodiments, data may include data read from memory array 120. Data may be transmitted between interface and control block 106 and memory array 120 along data lines 152.

Control lines 134 provide one or more control signals to interface and control block 106. Control signals provided over control lines 134 are not limited to any particular type of control signals. In various embodiments, control signals may be digital signals.

Interface and control block 106 is coupled to switching block 108 through connection 140. Connection 140 is not limited to any particular type of connection. Although connection 140 is shown as a single line, connection 140 may include several conductors, and may include one or more types of transmission lines. In various embodiments, one or more signals received from processor 102 and one or more signals generated by the interface and control block 106 are transmitted to switching block 108, as is further described below.

Switching block 108 is coupled to enhanced registers block 110 through connection 142. Connection 142 is not limited to any particular type of connection. Although connection 142 is shown as a single line, connection 142 may include several conductors and may include one or more type of transmission lines. In various embodiments, switching block 108 may include addresses of registers included in enhanced registers block 110. In various embodiments, connection 142 may be used to transmit data for setting memory devices 113 and 115 included in enhanced registers block 110, as further explained in more detail below. In various embodiments, one or more memory devices 113 and 115 may be employed as a filter, as explained in further detail below.

In various embodiments, enhanced registers block 110 includes group x registers 112 and group y registers 114. Group x registers may include actuator signals for controlling rows associated with memory array 120. Group y registers may include actuator signals for controlling columns associated with memory array 120. Enhanced registers block 110 includes connection 150 coupling enhanced registers block 110 to switching block 108. Connection 150 includes one or more control signals used in controlling one or more of the switching devices 109 of switching block 108.

Enhanced registers block 110 is coupled to memory array 120 through connection 144. Connection 144 is not limited to any particular type of connection. Although connection 144 is shown as a single line, connection 144 may include several conductors and may include one or more types of transmission lines. In various embodiments, connection 144 includes one or more actuator signals used to control operations of memory array 120, for example but not limited to, actuator signals for controlling rows and columns associated with memory array 120.

Memory array 120 may include flash memory, synchronous flash memory, NAND architecture flash memory, NOR architecture flash memory, and other types of non-volatile memory. While the description is directed to flash memory, the scope of the invention is not so limited. Other types of memory devices may include read only memory, dynamic random access memory, static random access memory, EEPROM memory. Additionally, the memory device could be a synchronous memory device such as SGRAM (Synchronous Graphics Random Access Memory), SDRAM (Synchronous Dynamic Random Access Memory), SDRAM II, and DDR SDRAM (Double Data Rate SDRAM), as well as Synchlink or Rambus DRAMs and other emerging memory technologies as known in the art.

Figure 2:
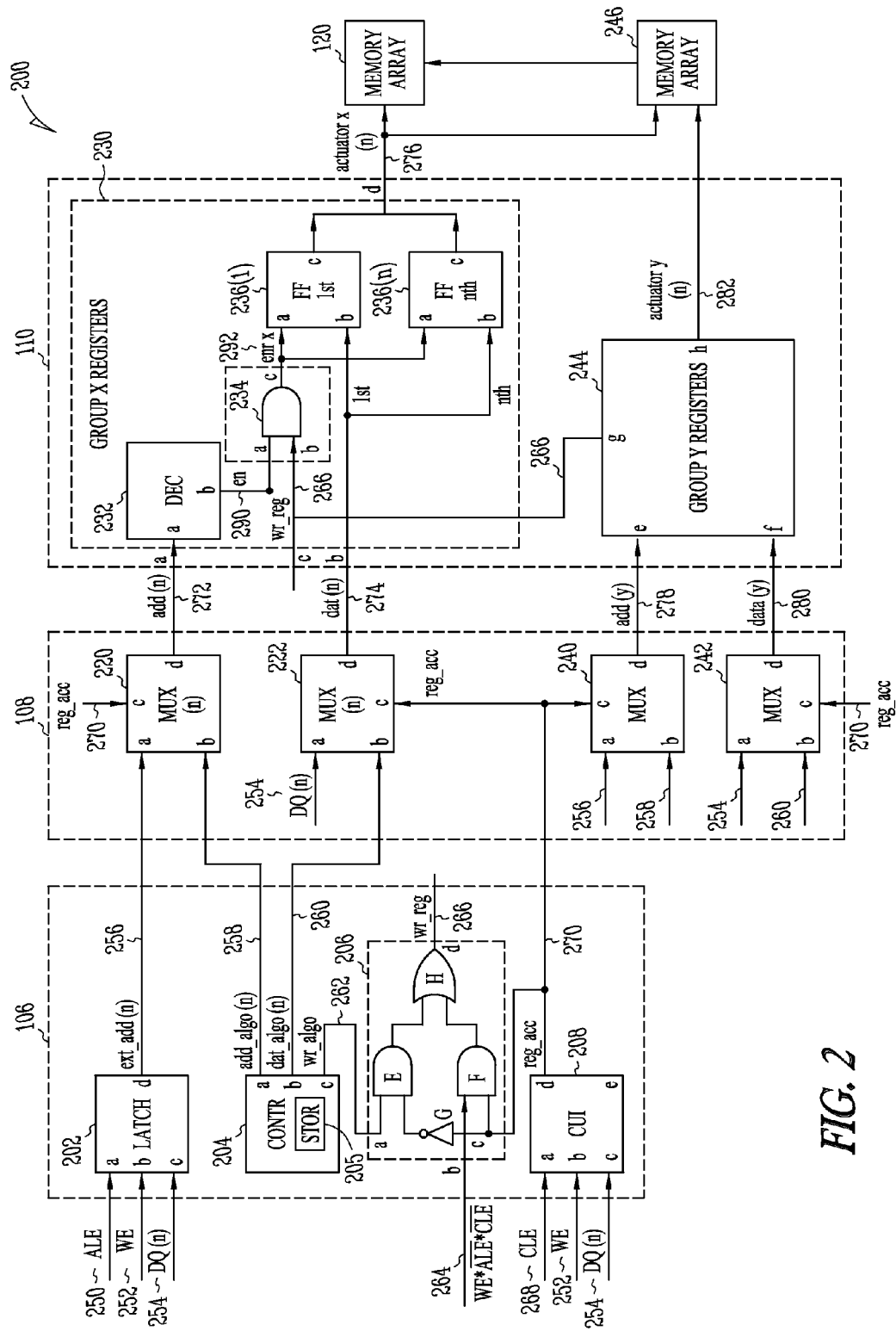
FIG. 2 illustrates a functional block diagram of an example embodiment of a register architecture.

FIG. 2 illustrates a functional block diagram of a register architecture 200. Register architecture 200 does not include a filter associated with enhanced registers block 110. Instead, register architecture 200 includes group x registers 230 and group y registers 244, which do not include the filter as further described in detail with respect to FIGS. 5A, 5B, 6, 7A-7C, 8A, 8B, and 9. Further, register architecture 200 does not include one or more additional switching devices and one or more additional logic circuits associated with and coupled to the filter, as explained in further detail below. However, an understanding of the register architecture 200 is useful in understanding the embodiments of register architectures that include the filter and the associated one or more additional switching devices and additional one or more logic circuits include in registers architectures that include a filter.

Register architecture 200 as shown in FIG. 2 includes the functional blocks as illustrated in FIG. 1, including interface and control block 106, switching block 108, registers block 110 (but not enhanced registers), and memory array 120. One or more of the couplings illustrated in FIG. 2 may be part of one or more of the interconnects as shown in FIG. 1. In various embodiments, register architecture 200 includes latch 202, controller (CONTR) 204, logic circuit 206, command user interface (CUI) 208, MUX(n) 220, and MUX(n) 222.

In various embodiments, register architecture 200 also includes group x registers 230. Group x registers 230 is representative of any register in a group, wherein the group is not limited to a particular group, but is designated by the letter "x" as representative of any group of registers associated with the group x registers 230. Group x registers 230 is not limited to a particular number of registers. Group x registers 230 may be one or more registers included in the group of registers designated as group x registers. In various embodiments, group x registers 230 provides actuator signals to memory array 120, including but not limited to actuator signals associated with the rows included in memory array 120.

In an embodiment, register architecture 200 includes group y registers 244. Group y registers 244 is representative of any register in a group, wherein the group is not limited to a particular group, but is designated by the letter "y" as representative of any group of registers associated with the group y registers 244. Group y registers 244 is not limited to a particular number of registers. Group y registers 244 may be one or more registers included in the group of registers designated as group y registers. In various embodiments, group y registers 244 provides actuator signals to memory array 120, including but not limited to actuator signals associated with the columns included in memory array 120. In embodiments employing group y registers 244, MUX(n) 240 and MUX(n) 242 may also be included in register architecture 200.

For the sake of simplicity, the internal diagram of group y registers 244 is not shown, but corresponds to the description as provided for group x registers 230. Embodiments of the invention are not limited to a particular number of total group registers. Although group x registers 230 and group y registers 244 are shown in FIG. 2, register architecture 200 may included any number of group registers, and may include any number of registers within any particular group. The number of registers in any particular group is not limited to a same number of registers in any other group included in register architecture 200.

In various embodiments, register architecture includes memory array 120. Memory array 120 is not limited to any particular type of memory. Register architecture is not limited to a single memory array. For example, register architecture 200 may include, for example but not limited to, a second memory array 246. Register architecture 200 is not limited to any particular number of memory arrays.

In various embodiments, register architecture may receive one or more external signals, including but not limited to an address latch enable (ALE) signal 250, a write enable (WE) signal 252, a data (DQ(n)) signal 254, and a command latch enable (CLE) signal 268. These external signals are not limited to any particular type of signals, and are not limited to any particular voltage levels. In various embodiments, these external signals are digital signals. In various embodiments, register architecture 200 may also receive a combinational signal including a combination of one or more of the above mentioned external signals, for example but not limited to combinational signal 264. Combinational signal 264 includes the WE signal 252 logically ANDed with the inverse (bar) ALE signal 250 logically ANDed with the inverse (bar) CLE signal 268.

In various embodiments, the external signals are provided by a device not included in register architecture 200, for example but not limited to processor 102 of FIG. 1. However, external signals are not limited to being provided by any particular type of device. External signals may be provided by a programmer or a tester or any other source or sources capable of providing the external signals.

In register architecture 200, latch 202 receives ALE signal 250 at input 202a, WE signal 252 at input 202b, and DQ(n) signal 254 at input 202c. In an embodiment, latch 202 provides ext_add(n) signal 256 at output 202d. Ext_add(n) signal 256 is not limited to a particular type of signal. In one embodiment, ext_add(n) signal 256 includes data associated with an address for one or more registers, including but not limited to group x registers 230 and group y registers 244.

In register architecture 200, controller 204 is not limited to any particular type of controller. In various embodiments, controller 204 is an algorithm controller. In various embodiments, controller 204 is embedded in memory device 104 of FIG. 1. Controller 204 may include storage 205, wherein storage 205 may include addresses for registers including, but not limited to, group x registers 230 and group y registers 244. Storage 205 may include data. Storage 205 may include instructions, including instructions for processing read, write, and erase algorithms related to memory, including but not limited to memory array 120 and memory array 246.

Controller 204 provides a signal 258 at output 204a. Signal 258 is not limited to any particular type of signal. In one embodiment, signal 258 is output signal add_algo(n), and includes address data associated with an address for one or more registers, including but not limited to group x registers 230 and group y registers 244. In one embodiment, this address data is address data stored in storage 205.

Controller 204 provides signal 260 at output 204b. Signal 260 is not limited to any particular type of signal. In one embodiment, signal 260 is a dat_algo(n) signal, and includes data that may be written to one or more registers, including but not limited to group x registers 230 and group y registers 244. In an embodiment, the data is data stored in storage 205.

Controller 204 provides signal 262 at output 204c. Signal 262 is not limited to any particular type of output signal. In one embodiment, signal 262 is a digital signal. In an embodiment, signal 262 is a wr_algo signal used to execute a write operation into one or more registers, including but not limited to, group x registers 230 and group y registers 244.

Logic circuit 206 receives signal 262 at input 206a. Logic circuit 206 receives combinational signal 264 input 206b. In an embodiment, input signal 264 is the combination signal WE*ALE(bar)*CLE(bar) as described above. Logic circuit 206 receives signal 270 at input 206c. Logic circuit 206 provides signal 266 at output 206d. In an embodiment, signal 266 is a "write register" wr_reg signal. Signal 266 is not limited to any particular type of signal. In one embodiment, signal 266 is a digital signal.

Logic circuit 206 is not limited to any particular type of logic circuit. Any logic circuit capable of receiving the above described signals and providing the signal 266 may be used for logic circuit 206. In various embodiments, logic circuit 206 includes AND gates 206e and 206f, inverter 206g, and NOR gate 206h, coupled as shown in FIG. 2.

In register architecture 200, CUI 208 receives CLE signal 268 at input 208a, WE signal 252 at input 208b, and the DQ(n) signal 254 at input 208c. Signal 268 is not limited to any particular type of signal. CUI 208 provides signal 270 at output 208d. Signal 270 is not limited to any particular type of signal. In various embodiments, signal 270 is a digital signal. In various embodiments, signal 270 is a register access (reg_acc) signal. In various embodiments, the status of signal 270 indicates a mode of operation for register architecture 200 as described in further detail below.

In various embodiments, register architecture 200 includes multiplexers MUX(n) 220 and MUX(n) 222. MUX(n) 220 and MUX(n) 222 are not limited to any particular type of multiplexer. MUX(n) 220 receives signal 256 at input 220a, and receives signal 258 at input 220b. MUX(n) 220 receives signal 270 at input 220c. MUX(n) 220 provides signal 272 at output 220d. In various embodiments, the status of signal 270 at input 220c determines which of inputs 220a or 220b is coupled to output 220d of MUX(n) 220. Signal 272 is not limited to any particular type of signal. In an embodiment, signal 272 corresponds to one of either signal 256 or signal 258, as will be described in greater detail below.

MUX(n) 222 receives signal 254 at input 222a, and receives signal 260 at input 220b. MUX(n) 222 receives signal 270 at input 222c. MUX(n) 222 provides signal 274 at output 222d. In various embodiments, the status of signal 270 at input 222c determines which of inputs 222a or 222b is coupled to output 222d of MUX(n) 222. Signal 274 is not limited to any particular type of signal. In an embodiment, signal 274 corresponds to one of either signal 254 or signal 260, as will be described in greater detail below.

In various embodiments, register architecture 200 includes multiplexers MUX(n) 240, MUX(n) 242, and group y registers 244. MUX(n) 240 receives signal 256 at input 240a, signal 258 and input 240b, and signal 270 at input 240c. MUX(n) 240 provides signal 278 at output 240d. Signal 278 is not limited to any particular type of signal. In various embodiments, the status of signal 270 at input 240c determines which of inputs 240a or 240b is coupled to output 240d of MUX(n) 240. In various embodiments, signal 278 corresponds to one of either signal 256 or signal 258.

MUX(n) 242 receives signal 254 at input 242a, signal 260 at input 242b, and signal 270 at input 242c. MUX(n) 242 provides signal 280 at output 242d. Signal 280 is not limited to any particular type of signal. In various embodiments, the status of signal 270 at input 242c determines which of inputs 242a or 242b is coupled to output 242d of MUX(n) 242. In various embodiments, signal 280 corresponds to one of either signal 254 or signal 260.

Group x registers 230 receives signal 272 at input 230a, receives signal 274 at input 230b, receives signal 266 at input 230c and provides signal 276 at output 230d. Signal 276 is not limited to any particular type of signal. In an embodiment, signal 276 includes one or more actuators(n) signals for controlling processes related to, for example but not limited to, memory array 120. Although signal 276 is shown in FIG. 2 as a single line, signal 276 may include one or more signal lines. The one or more signal lines may be provided by a plurality of memory devices, for example but not limited to memory devices 236(1) through 236(n). The number of memory devices included in group x registers 230 is not limited to any particular number. In various embodiments, group x registers 230 includes eight memory devices (represented by the dotted line shown in FIG. 2 between memory device 236(1) and 236(n). Each of the memory devices 236(1) through 236(n) may represent a bit in an eight bit register. However, group x registers 230 is not limited to an eight bit register. Other embodiments may include sixteen bit, thirty-two bit, and sixty-four bit registers, i.e. 2" registers where n is greater than zero and typically greater than four.

Group x registers 230 includes decoder (DEC) 232, and one or more memory devices 236(1) through 236(n) as described above. Each of memory devices 236(1) through 236(n) is associated with a logic circuit, such as logic circuit 234 as shown coupled to memory devices 236(1) through 236(n). DEC 232 is coupled to MUX(n) 220, and receives signal 272 at input 232a. DEC 232 provides enable signal 290 at output 232b. Signal 290 is coupled to an input 234a of logic circuit 234.

Signal 266 is coupled to another input of logic circuits 234. For example, signal 266 is coupled to input 234b of logic circuit 234. In various embodiments, signal 266 is the wr_reg signal.

Logic circuit 234 provides signal 292 at one output, for example output 234c. Signal 292 is not limited to any particular type of signal. In various embodiments, signal 292 is a digital signal. Signal 292 includes the "enr x" signal that enables associated memory devices 236(1) through 236(n) to acquire data at another input of each of the memory devices. For example, memory device 236(1) receives the 1st component of the data provided as the dat(n) signal 274 at input 236(1)b of memory device 236(1). Each of the additional components of the dat(n) signal 274 are received at an input of one of the additional memory devices up to and including memory device 236(n). When the "enr x" signals is provided, each of the components present in the dat(n) signal 274 will be latched into the one of the memory devices 236(1) through 236(n) to which the dat(n) signal 274 is coupled. Signal 274 is provided by the output 222d of MUX(n) 222.

In various embodiments, the data input into memory device 236(1) is provided as the actuator x 1st component portion of signal 276 at output 236(1)c of memory device 236(1). In addition, each of the data components input into the additional memory devices through 236(n) are provided as the additional actuator x component portions of signal 276 at each of the outputs of these additional memory devices up to and including 236(n) In various embodiments, signal 276 is the first through the nth component of group x actuator signals provided to one or more memory arrays, for example but not limited to, memory array 120 and memory array 246.

The details of group y registers 244 have not been shown for the sake of simplicity. However, the details of group y registers 244 include all of the embodiments provided for in describing the group x registers 230. In various embodiments, the group y registers 244 provides group y actuator signals 282 to one or more memory arrays, for example but not limited to memory array 120 and memory array 246.

Figure 3:
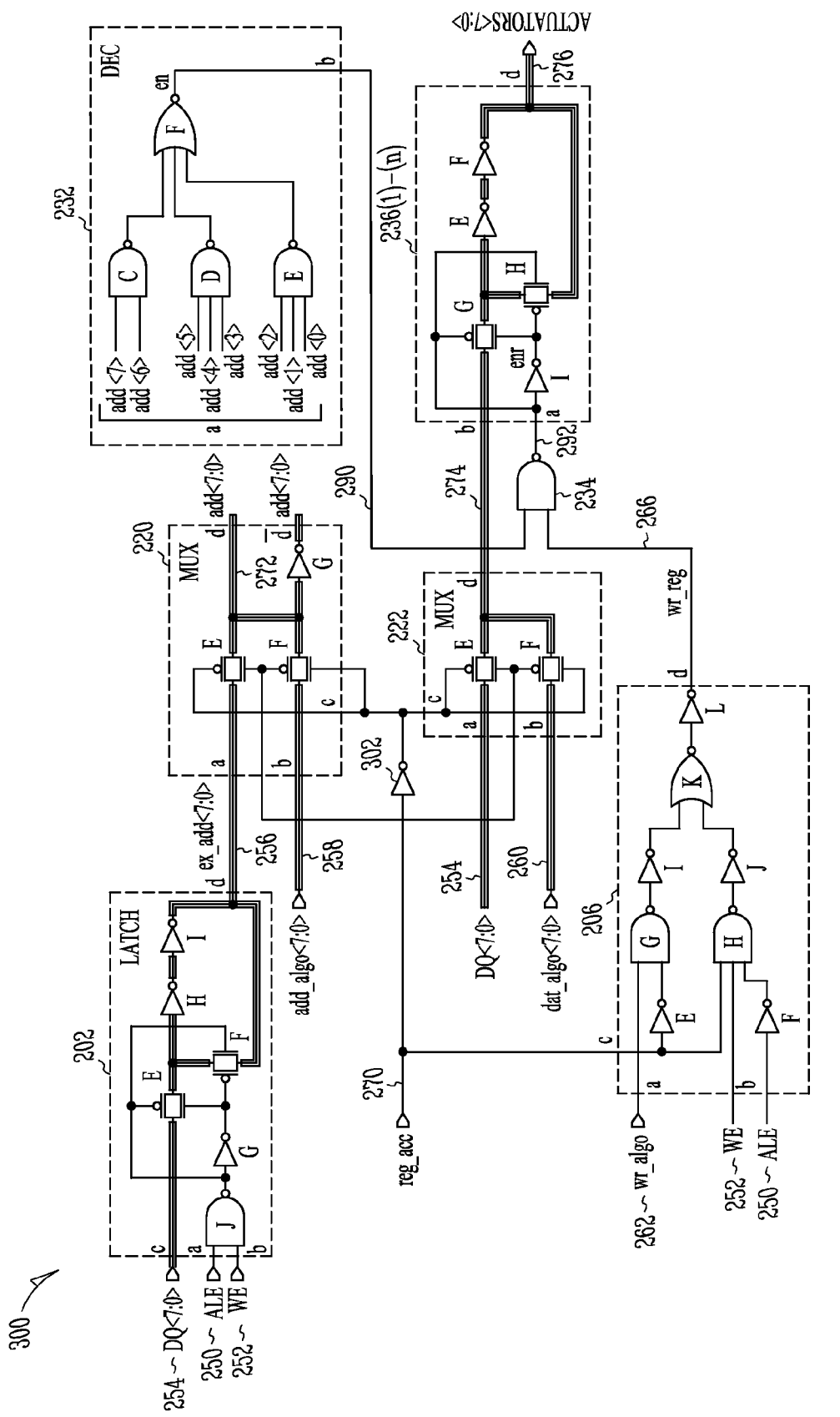
FIG. 3 illustrates a schematic diagram of one or more devices included in the exemplary embodiments of a register architecture reported in FIG. 2.

FIG. 3 illustrates a schematic diagram 300 of one or more functional blocks of register architecture 200. Latch 202 includes logic elements 202g, 202h, 202i, and 202j, and further includes pass gates 202e and 202f. Based on the status of ALE signal 250 and WE signal 252, latch 202 will latch the status of all signal lines provided as signal 254 DQ(n) into latch 202, and provide the status of all latched signal lines at output 202d, and will continue to provide the latched status of the signal lines at output 202d even after the data present on signal 254 DQ(n) has been removed. DQ(n) is shown in FIG. 3 as data lines DQ<7:0>, representing 8 data lines. However, DQ(n) is not limited to any particular number of data lines. In various embodiments, DQ(n) may include sixteen, thirty-two, or sixty-four data lines, or another number of lines equal to $2^n$ data lines where n is greater than zero. In various embodiments, the latched signals include an address supplied from an external source, as explained in further detail below.

Latch 202 provides signal 256, to MUX(n) 220. MUX(n) 220 includes pass gates 220e and 220f. Based on the status of the signal present at input 220c, MUX(n) 220 may provide the signal lines included in signal 256 from latch 202 at output 220d, or may provide the signal lines included in signal 258 at output 220d. In various embodiments, signal 256 includes an address supplied and latched from an external source, wherein signal 258 includes an address supplied by controller 204, as explained in more detail below. In various embodiments, MUX(n) 220 supplies the inverted signals of the signal lines through logic element 220g at output 220d(bar).

DEC 232 includes logic elements 232*c*, 232*d*, 232*e*, and 232*f*. In various embodiments, DEC 232 receives at input 232*a* the signal lines provided by MUX(n) 220 at output 220*d*, and provides a decoded output as enable signal 290 at output 232*b*. The decoded output is provided as enable signal 290, and is applied to one or more logic circuits, such as but not limited to, logic circuit 234.

In various embodiments, logic circuit 206 includes logic elements 206*e*, 206*f*, 206*g*, 206*h*, 206*i*, 206*j*, 206*k*, and 206*l*. Based on the status of the signal 262 at input 206*a*, the ALE signal 250 and WE signal 252 at input 206*b*, and signal 270 at input 206*c*, logic circuit 206 will provide signal 266 at output 206*d*. Signal 266 is applied to one or more logic circuits, such as but not limited to logic circuit 234. Logic circuit 234 provides an output as signal 292, which is coupled to an enable input of a memory device, such as memory device 236.

MUX(n) 222 includes pass gates 222*e* and 222*f*. Based on the status of the signal present at input 222*c*, MUX(n) 222 may provide the signal lines included in signal 254 at output 222*d*, or may provide the signal lines included in signal 260 at output 220*d*. In various embodiments, signal 254 includes data supplied by an external source, wherein signal 260 includes data supplied by controller 204, as explained in more detail below. Again, DQ(n) is not limited to any particular number of signal lines. In various embodiments, signal 270 supplied to input 220*c* of MUX(n) 220 and input 222*c* of MUX(n) 222 may be inverted through logic element 302.

Memory devices 236(1) through 236(*n*) include logic elements 236*e*, 236*f*, and 236*i*, and pass gates 236*g* and 236*h*. Memory devices 236(1) through 236(*n*) receive signal 292 at input 236*a*, and receive the signals provided on the signal lines from MUX(n) 222 at input 236*b*. Memory devices 236(1) through 236(*n*) provide signal 276 at output 236*d*. In various embodiments, memory devices 236(1) through 236(*n*) include a plurality of flip-flop circuits, wherein each flip-flop circuit stores one of the components of the data signals 274. Memory devices 236(1) through 236(*n*) are not limited to any particular type of flip-flop circuit. In various embodiments, memory devices 236(1) through 236(*n*) include a plurality of individually settable memory devices, for example but not limited to, eight individual memory devices each individually settable according to data received at input 236*b* on a plurality of data input lines. In various embodiments, the status of each of the individual memory devices included in memory device 236(1) through 236(*n*) is provided at one of outputs 236*c* (as shown in FIG. 2) as individual signal lines included in the plurality of signals included in actuator signal 276.

The operation of a register architecture such as register architecture 200 will now be described with reference to FIGS. 2, 3, and 4A-4D. In operation, register architecture 200 may operate in one or more modes. Register architecture 200 may operate in a first mode, referred to as "user mode," and in a second mode, referred to as "test mode." In various embodiments, when register architecture 200 is in user mode, registers in group x registers 230 (and group y registers 244 if present) are written to and controlled by the controller 204, and when register architecture 200 is in test mode, group x registers 230 (and group y registers 244 if present) are written to and controlled based on the external signals received by register architecture 200. These external signals may be provided by a processor, such as the processor 102 of FIG. 1. In some embodiments, the external signals are received from a tester or a programmer (as shown for example in FIG. 9), or some other programming device. In various embodiments, processor 102 may be included in the tester or programmer proving the external signals.

Figure 4A:
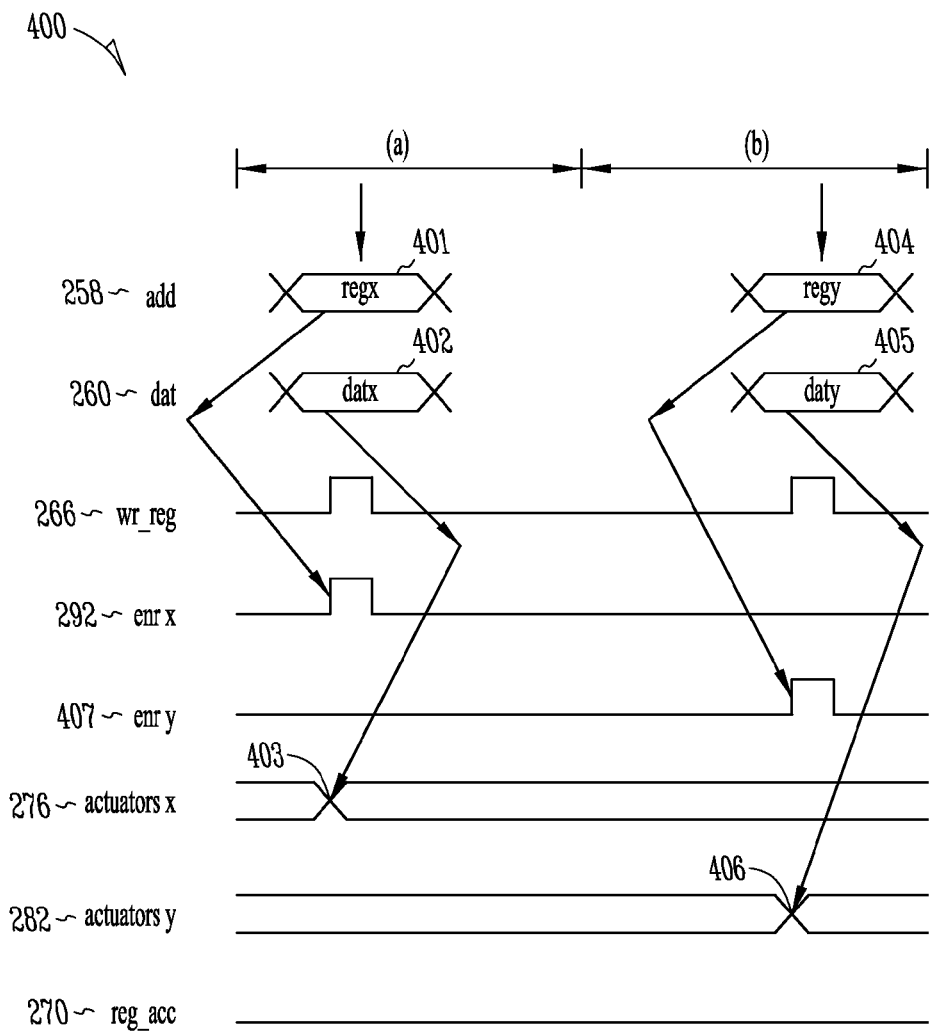
FIG. 4A illustrates a timing diagram for one or more example embodiments of register architectures operating in a first mode.

Operation of register architecture 200 in user mode is now described by referring to FIG. 2 and FIG. 4A. CUI 208 is designed to recognize if a particular code on signal 254, the DQ(n) data, is a user mode command or if it is a test mode entry request. Assuming CUI 208 does not receive a test mode entry request, CUI 208 will set signal 270 (reg_acc) to a particular setting representative of user mode, for example but not limited to the setting as shown in FIG. 4A. In one embodiment, signal 270 will be set to a level corresponding to a digital "zero." When signal 270 is set to represent user mode, signal 270 will be received at MUX(n) 220, and at MUX(n) 222, and will cause MUX(n) 220 and MUX(n) 222 to switch to the inputs received from controller 204. MUX(n) 220 will switch to input 220*b*, and will supply a signal corresponding to signal 258 at output 220*d*. Therefore, signal 272 (add(n)) will correspond to the signal 258 provided by controller 204. MUX(n) 222 will switch to input 222*b*, and will supply a signal corresponding to signal 260, the dat_algo(n) signal also provided by controller 204, at output 222*d*.

In various embodiments including MUX(n) 240, MUX(n) 242, and group y registers 244, when signal 270 (reg_acc) is set to user mode, MUX(n) 240 and MUX(n) 242 will also switch to receive inputs from controller 204. MUX(n) 240 will switch to input 240*b*, and will supply a signal corresponding to signal 258 at output 240*d*. Therefore, signal 278 (add y (n)) will correspond to the signal 258. MUX(n) 242 will switch to input 242*b*, and will supply a signal corresponding to signal 260 at output 242*d*. Therefore, signal 280 (dat y (n)) will correspond to dat_algo(n) supplied from controller 204.

In user mode, controller 204 starts operating and writes sequences of data (data=dat_algo(n)) into selected registers. The selected registers to be written to are determined by addresses provided by signal 258 (address=add_algo(n)). Proper group x actuator signals 276 or group y actuator signals 282 are generated according to the signals provided by controller 204. In various embodiments, these data and address instructions are stored in storage 205 of controller 204. Storage 205 may also include one or more instructions that control the issuance of the data and address signals.

Every register group, for example but not limited to group x registers 230 and group y registers 244, has a decoder designed to generate an enable signal (en) when the specific address associated with that register is provided. In FIG. 2, group x registers 230 includes decoder 232 coupled to receive signal 272 at input 232*a*. When the specific address is received at decoder 232 which corresponds to group x registers 230, decoder 232 provides an enable signal at output 232*b*. The enable signal is not limited to any particular type of signal. In an embodiment, the enable signal is a digital signal. The enable signal is received at input 234*a* of logic circuit 234. In an embodiment, logic circuit 234 is an AND logic circuit, and input 234*a* is one input to the AND logic circuit. A second signal 266 is received at input 234*b* of logic circuit 234. In an embodiment, input 234*b* is the second input to the AND logic circuit of logic circuit 234.

Signal 266 is provided at output 206*d* of logic circuit 206. In an embodiment, when register architecture 200 is in user mode, controller 204 provides signal 262 on output 204*c* which produces a signal at output 206*d* of logic circuit 206. In various embodiments, signal 266 is a strobe signal as shown in FIG. 4A. Signal 266 is not limited to any particular type of signal. In one embodiment, signal 266 is a digital signal. When the strobe signal provided as signal 266 is "on" or in an enabled state, signal 266 is applied to input 234*b* of logic circuit 234. When applied along with the enable signal provided from decoder 232 at input 234*a* of logic circuit 234, logic circuit 234 will generate an enable register x (enr(x)) signal 292 at input 236a of memory device 236. Activation of the enable register x signal at input 236a will cause the data bits present at inputs 236b of each memory devices 236(1) through 236(n) to be written into group x registers 230. The data bits provided at the inputs 236b of each of memory devices 236(1) through 236(n) are generated by controller 204 at output 204c as signal 260, and are coupled to the inputs 236b through MUX(n) 222, which is switched to receive signal 260 from controller 204 and provide a corresponding signal 274 to memory devices 236(1) through 236(n).

The data bits provided by controller 204 and stored into memory devices 236(1) through 236(n) are provided as the actuator signals included in signal 276 at output 236c of memory devices 236(1) through 236(n). Thus, by providing address data at signal 258, register data at signal 260, and a strobe signal at signal 262, controller 204 may write, erase and rewrite data into memory devices 236(1) through 236(n), and thus control actuator signal 276, which in turn controls operations associated with one or more memory arrays, such as memory array 120 and memory array 246.

In a similar manner, in embodiments that include MUX(n) 240, MUX(n) 242, and group y registers 244, when register architecture 200 is operating in user mode, controller 204 may direct write operations to group y registers 244 by providing at signal 258 an address that corresponds to group y registers 244. The components included in group y registers 244 are a duplication of those shown for group x registers 230, and have been omitted from FIG. 2 for the sake of simplicity. When signal 258 includes an address that corresponds to group y registers 244, the decoder included in the group y registers 244 provides an enable signal to the logic circuit included in the group y registers 244, which, when also provided with a wr_reg strobe signal from signal 266, would provide an enable register y (enr(y)) signal to the memory devices of group y registers 244. Controller 204 also provides the data bits as signal 260, coupled through MUX(n) 242 to be provided to the memory devices of group y registers 244, and written as actuator signal 282 to the one or more memory arrays.

FIG. 4A shows a timing diagram 400 of signals for a write operation in user mode. During the entire time period, reg_acc signal 270 remains low, indicating that the register architecture 200 is in user mode. During the time period designated as time surrounding "(a)" in FIG. 4A, controller 204 provides an address as signal 258 (e.g., add_algo(n)) in FIG. 2) that includes an address 401 that corresponds to group x registers 230. The address is represented as "regx" in FIG. 4A. Since reg_acc signal 270 is low, this address data will travel along a path including MUX 220 to decoder 232 as described above with respect to FIG. 2. Decoder 232 will decode the address signal, and because the address 401 corresponds to the group x registers 230, decoder 232 will provide an "en" signal as enable signal 290.

During this same time period, controller 204 will provide data 402 on signal 260 (e.g., dat_algo(n) in FIG. 2). The signal 260 includes data bits to be written to group x registers 230. The data is represented as "datx" in FIG. 4A. Since reg_acc signal 270 is low, this data will travel along a path through MUX 222 and be provided as dat(n) signal 274 at inputs 236b at each of memory devices 236(1) through 236(n).

During this same time period, controller 204 will provide a strobe signal on signal 262 (e.g., wr_algo in FIG. 2). The signal 262 will be applied to input 206a of logic circuit 206. Since reg_acc signal 270 is low, this strobe signal will be provided at output 206d which is coupled to logic circuit 234 as wr_reg signal 266 as shown in FIG. 4A. With the enable signal 290 present from DEC 232, the strobe at the wr_reg signal 266 will cause logic circuit 234 to provide a signal 292 at inputs 236a of each of memory devices 236(1) through 236(n), causing the data present at the inputs 236b of each of memory devices 236(1) through 236(n) to be written into memory devices 236(1) through 236(n). Writing data to memory devices 236(1) through 236(n) will result in the actuator signals 276 for group x registers 230 to now be set according to the written data. This is represented by inflection point 403 as shown in FIG. 4A for actuators x signal 276.

A similar process is show in FIG. 4A relating to controller 204 writing data to group y registers 244 in user mode. During the time period surrounding the time designated as "(b)" in FIG. 4A, controller 204 provided address 404, shown as "regy" and relating to the address of group y registers 244. During this time period, controller 204 also provides data 405, shown as "daty" and relating to data to be written to group y registers 244. Because signal 270 is low, these address and data signals are passed through to the group y registers through MUX(n) 240 and MUX(n) 242 respectively in a similar manner as described above for the group x registers 230. During this time period, controller 204 generates the strobe signal 262 (wr_algo). Because signal 270 is low, a strobe signal appears on wr_reg signal 266, causing the enr y signal 407 be strobed, as shown in FIG. 4A. Strobing the enr y signal 407 will cause the data from controller 204 to be written to the group y registers 244 in a similar manner as described above with respect to the group x registers 230. Writing the data to the group y registers 244 will cause the actuator signals 282 to now be set according to the data 405 included in "daty". This setting of actuator signals 282 is represented by inflection point 406 in FIG. 4A.

In this manner, one or more algorithms may be executed by controller 204 that cause controller 204 to write and re-write the data to any of group x registers 230 or group y registers 244. Through these manipulations, controller 204 is able to control operations related to memory array 120, and the additional memory array 246 if present.

In addition to the user mode, register architecture 200 of FIG. 2 may operate in test mode. In various embodiments, CUI 208 is capable of detecting that a test mode is desired based on one or more patterns or levels of external signals received at CUI 208. Detection of a test mode is not limited to any particular signal or sequence of signals. However, when a determination has been made that a test mode is desired, CUI 208 will provide signals at output 208d that will cause register architecture 200 to operate in test mode. During test mode, the MUXes illustrated in FIG. 2 (220, 222, 240, 242) will be signaled to switch so as to provide addresses, data and control signals supplied from the external signal lines to group x registers 230 and group y registers 244. While in test mode, the external signals, and not controller 204, may write and re-write data to at least one of group x registers 230 and group y registers 244, and thus control the operation of memory array 120 (or memory array 246 if present) as is further described in more detail below.

Figure 4B:
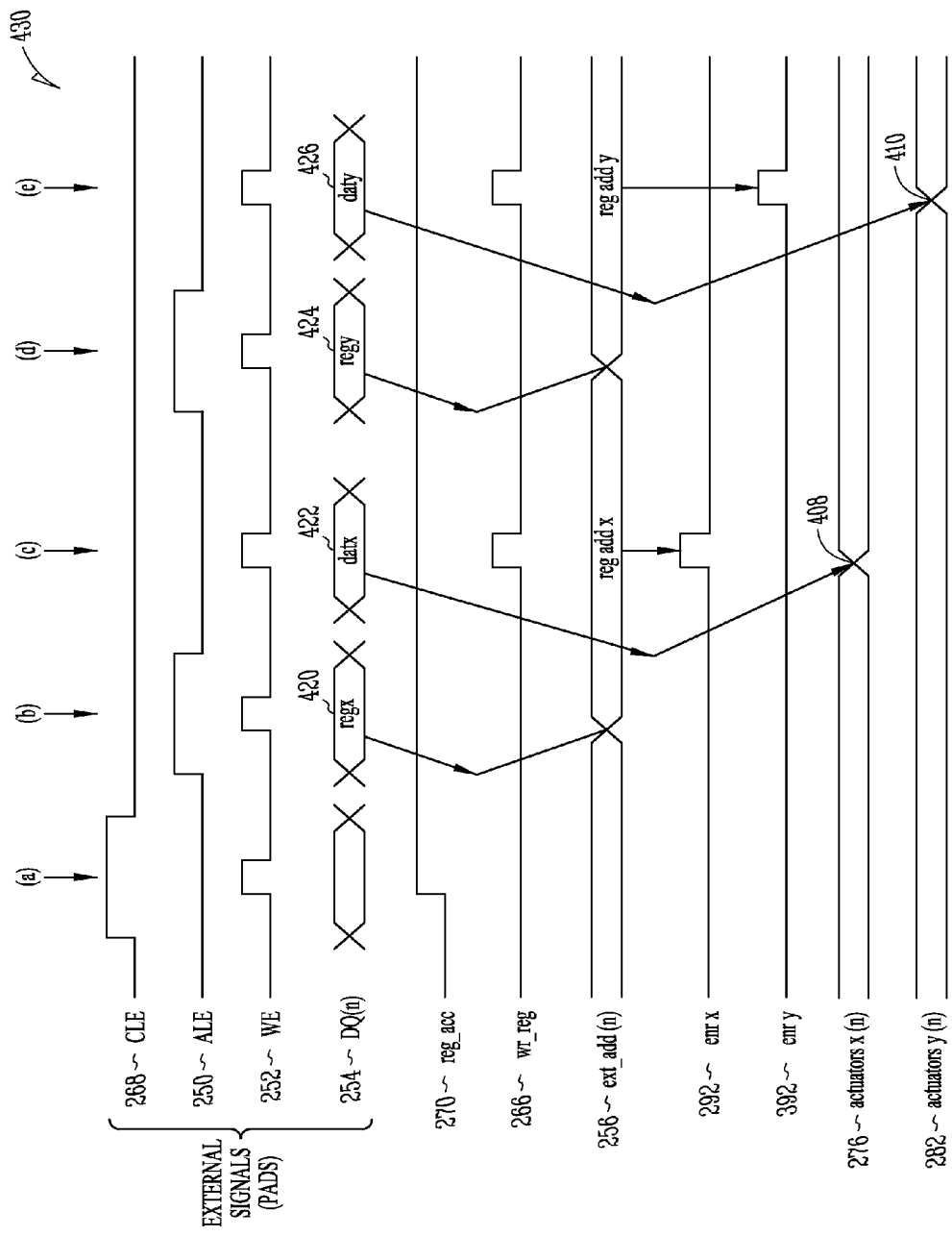
FIG. 4B illustrates a timing diagram for one or more example embodiments of register architectures operating in at least a first mode and a second mode.

FIG. 4B illustrates waveforms 430 for register architecture 200. In an embodiment, CUI 208 determines that a test mode is desired by monitoring signal 268 (CLE), signal 252 (WE), and signal 254 (DQ(n)). As illustrated in FIG. 4B, around time period "(a)" the CLE signal 268 changes from a low to a high state, the WE signal 252 changes from a low to high state, and the code representing a request to enter register access test mode appears on the DQ(n) signal 254 line. At this time, CUI 208 determines that register access test mode is desired and changes the level of reg_acc signal 270, from a low state to a high state.

The change in the level of reg_acc signal 270 is received by each of the MUXes 220, 222, 240, and 242. Reg_acc signal 270 is applied to the control portion of MUXes 220, 222, 240, 242 so that the MUXes will shift and connect the externally supplied address signals and the externally supplied data signals to group x registers 230 and group y registers 244. For example, when the level of reg_acc signals 270 associated with the test mode is applied to input 220c of MUX(n) 220, MUX(n) 220 will switch so that input 220a is coupled to output 220d. This switching will thereby couple external addresses supplied from latch 202 as shown in FIG. 2 as ext_add(n) signals 256 to decoder 232, as shown in FIG. 2.

In addition, when the level of reg_acc signal 270 associated with the register access test mode is applied to input 222c of MUX(n) 222, MUX(n) 222 will switch so that input 222a is coupled to output 222d. This switching will thereby couple the external data signal 254 (DQ(n) in FIG. 2) to the data input, for example inputs 236(1)b through 236(n)b of memory device 236(1) through 236(n).

In addition, input signal 264, which is a combination of three externally supplied signals (WE*ALE(bar)*CLE(bar)) is provided to logic circuit 206 at input 206b. The reg_acc signal 270 is also supplied to input 206c of logic circuit 206. Because reg_acc signal 270 is indicating a test mode, logic circuit 206 will couple the signals provided by external signal 264 to output 206d, the wr_reg signal 266. Logic circuit 206 will also disconnect the wr_algo signal 262 provided by controller 204 from the output 206d.

Thus, by changing the level of reg_acc signal 270 to indicate a test mode, register architecture 200 of FIG. 2 is now arranged to receive external address, external data, and external strobe signals in place of the signals provided by controller 204. When these externals signals are controlled by a device such as the processor 102 in FIG. 1, or some other tester or programming device, the processor, tester, or other programming device may write and re-write data to group x registers 230 and group y registers 244, and thus control memory array 120 (or memory array 246 if present).

Referring to FIG. 4B, once the register access test mode has been determined, reg_acc signal 270 is in a high state, indicating that the register architecture is in test mode. At the time period approximately surrounding "(b)" in FIG. 4B, address data 420 for group x registers 230, represented by "regx" is provided on DQ(n) signal 254 at latch 202 in FIG. 2. Latch 202 can be signaled, for example using ALE signal 250 and WE signal 252, causing the address data present on DQ(n) signal 254 to be latched to output 202d, This latched address data is provided as ext_add(n) 256 as shown in FIG. 2. The ext_add(n) signal 256 is supplied to decoder 232 through MUX(n) 220 as described above. When the address data as shown in FIG. 4B corresponds to the address of group x registers 230, the enable signal 290 will change state and provide an enable signal to logic circuit 234 through signal 290 as shown in FIG. 2.

At the time period surrounding "(c)" of FIG. 4B, data 422 to be written into group x registers 230 and represented by "datx" is provided on DQ(n) signal 254. As illustrated in FIG. 2, this data signal is provided directly to MUX(n) 222 at input 222a, and thus is also provided at output 222d, which is coupled to data inputs 236b of each of memory devices 236 (1) through 236(n).

By strobing the input 206b of logic circuit 206, at around time "(c)" in FIG. 4B, the wr_reg signal 266 will be strobed, causing the enr x signal 292 to be strobed. This combination of signals, including the address data supplied to the decoder 232 and the data present at inputs 236b, will cause "datx" to be written to memory devices 236(1) through 236(n). Writing the data to memory devices 236(1) through 236(n) will cause the actuator signals 276 to now be set according to the data written to memory devices 236(1) through 236(n). This is represented by inflection point 408 in FIG. 4B for actuator x signals 276.

The strobe input on input 206b of logic circuit 206 is provided as signal 266. However, since register architecture 200 is now in test mode, logic circuit 206 in FIG. 2 is now configured to couple combinational signal 264 to the output 206d as wr_reg signal 266. Further, logic circuit 206 has disconnected controller 204 from the output 206d, and so controller 204 is no longer affecting the wr_reg signals provided as signal 266.

Additional signals may be used to write data to group y registers 244 as illustrated by the signals surrounding time periods "(d)" and "(e)" in FIG. 4. At the time period surrounding "(d)" address data 424 associated with group y registers 244 ("regy") is provided by DQ(n) signal 254 and latched as ext_add(n) signal 256. At the time period surrounding "(e)" data 426 is provided by DQ(n) signal 254 and strobed into group y registers 244 in conjunction with a strobe signal on enr y signal 392, thus setting actuator signals 282 according to the received data. This is represented by the inflection point 410 in FIG. 4B.

Termination of the test mode may be detected by a combination of signals provided to CUI 208. In one or more embodiments, CUI 208 is capable of detecting that a test mode is terminated based on one or more patterns or levels of signals received at CUI 208 from external signals CLE 268, WE signal 252, and DQ(n) signal 254. Detection of the termination of a test mode is not limited to any particular signal or sequence of signals. However, when a determination that a test mode is to be terminated has been detected, CUI will return the reg_acc signals 270 to a level that will indicate a test mode is no longer in effect. At this time, operation of the register architecture 200 may return to one or more different modes, for example, the user mode as described above.

In test mode, signals provided though external signal lines, for example address lines 130, data lines 132, and control lines 134, as shown in FIG. 1, may be used to write and re-write data to group x registers and group y registers, and thus control the operation of memory array 120 (and memory array 246 if present). As described above, test mode includes switching the MUXes, for example MUXes 220, 222, 240, and 242, to couple their outputs to the inputs coupled to or controlled by the external signals. This also has the effect of disconnecting the group registers from the address signals and the data signals provided by controller 204. As also noted above, logic circuits, for example logic circuit 206 of FIG. 2, disable controller 204 from strobing the wr_reg signal 266, which controls the time for writing data into the group registers. Thus, during test mode, even if controller 204 were operating to provide signals on its outputs (for example, outputs 204A-C in FIG. 2) these signals would be ignored because they would be disconnected from the inputs that are now controlling the group registers.

Because of this separation, test programs can be performed in the test mode without having to perform any modifications to the software, firmware, or hardware associated with the operation of the register architecture in user mode. If different test programs or routines are desired, the routines or programs may be changed by altering the external signals provided in the test mode, without the need to change anything associated with the operations of the register architecture in user mode.

However, when returning to user mode, the controller 204 again writes data to group x registers 230 (and group y registers 244 if present) according to the instructions, addresses, and data included in controller 204. It is therefore not possible for register architecture 200 to maintain the settings written to the group registers in test mode once the controller 204 again executes one or more of its algorithms that include writing data to the group registers. The algorithms of controller 204 re-writes the group register contents according to the algorithm being performed by controller 204, and thus removes the actuator setting provided during test mode for the particular register being written to in the user mode.

Figure 4C:
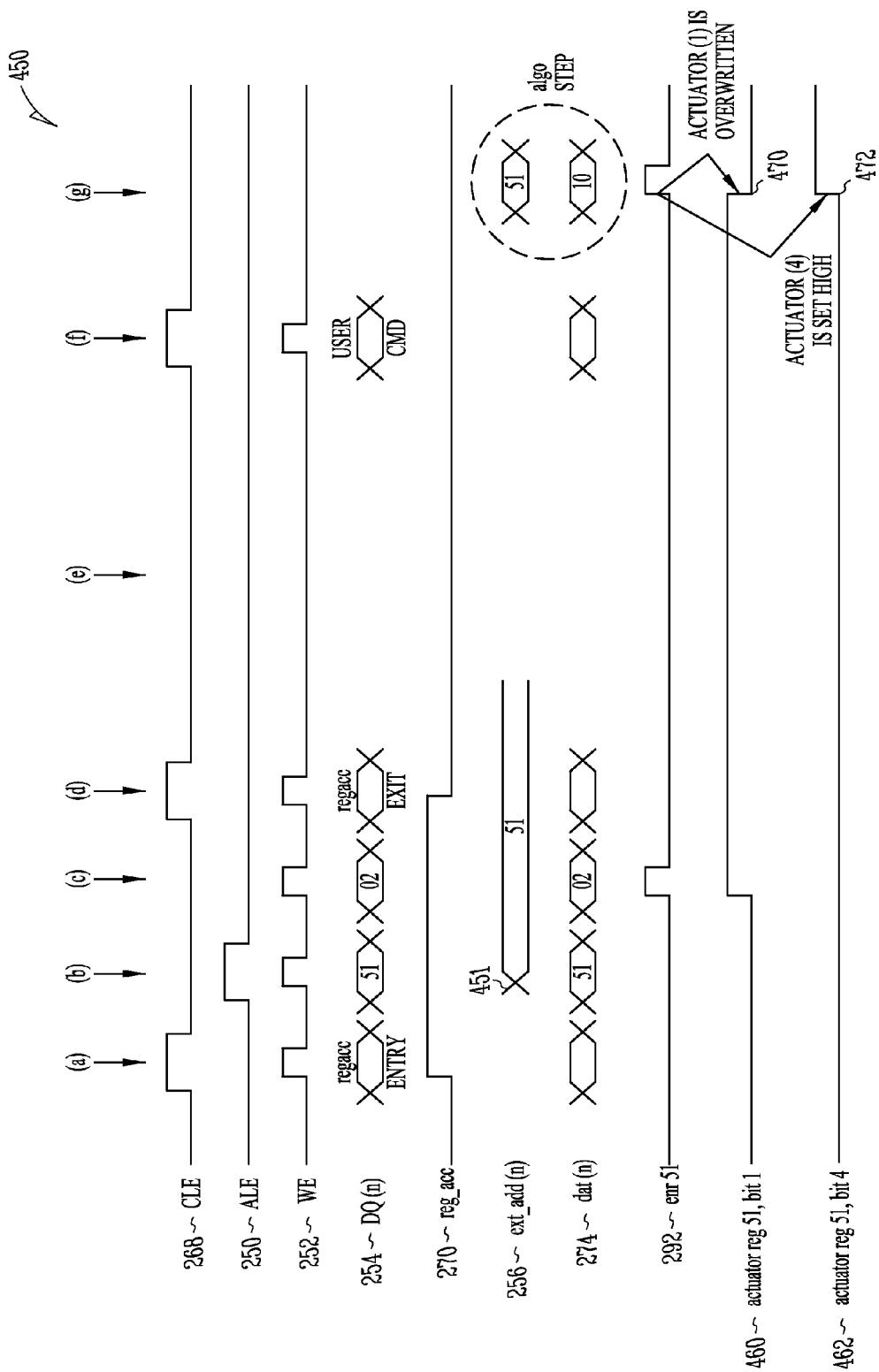
FIG. 4C illustrates a timing diagram for one or more example embodiments of register architectures operating in a second mode subsequent to operating in a first mode.

FIG. 4C illustrates waveforms 450 representing this overwriting of the actuator settings provided in a test mode during a subsequent user mode. Around time period "(a)" the combination of CLE signal 268, ALE signal 250, and WE signal 252, along with DQ(n) signal 254 indicate that a request to enter the register access test mode is being made. In response, signal 270 (reg_acc) changes state to indicate that the register access test mode is active. Time periods "(b)," "(c)," and "(d)" represent addressing a register (for example a register "51" as shown by signal 254 latched as ext_add(n) at inflection point 451), writing data to the register (for example hexadecimal data 02, represented as binary 0000 0010), and then exiting test mode. In various embodiments, example register 51 is at least one of group x registers 230 or group y registers 244. Writing hexadecimal data 02 to register 51 sets actuator 51, bit 1 high (wherein register 51 includes for example bit 0 through bit 7), and sets all the other bits (in particular bit 4) of actuator 51 to low, as shown in FIG. 4C by signals 460 and 462 respectively.

In various embodiments, time period "(e)" may represent a mode other than user mode or test mode. At time period "(f)", external signals requesting entry of user mode are provided. In various embodiments, user mode may be resumed after exiting test mode without the need for a request to enter user mode. As noted above, in user mode the group registers are being addressed, and data is being written to the group registers as it is being provided by controller 204. At time period "(g)," register 51 is again addressed, this time based on an algorithm provided by controller 204, and an hexadecimal data value of 10, (for example as represented as a binary 0001 0000), is written to register 51. As a result, the status of bit 1 of register 51 is changed (overwritten) to a low state, and the state of bit 4, which was left low following the test mode, is changed (overwritten) to a high state, as shown by inflection points 470 and 472 respectively.

Thus, register architecture 200 overwrites any particular register settings provided in test mode once the particular register is written to in a subsequent user mode.

Figure 4D:
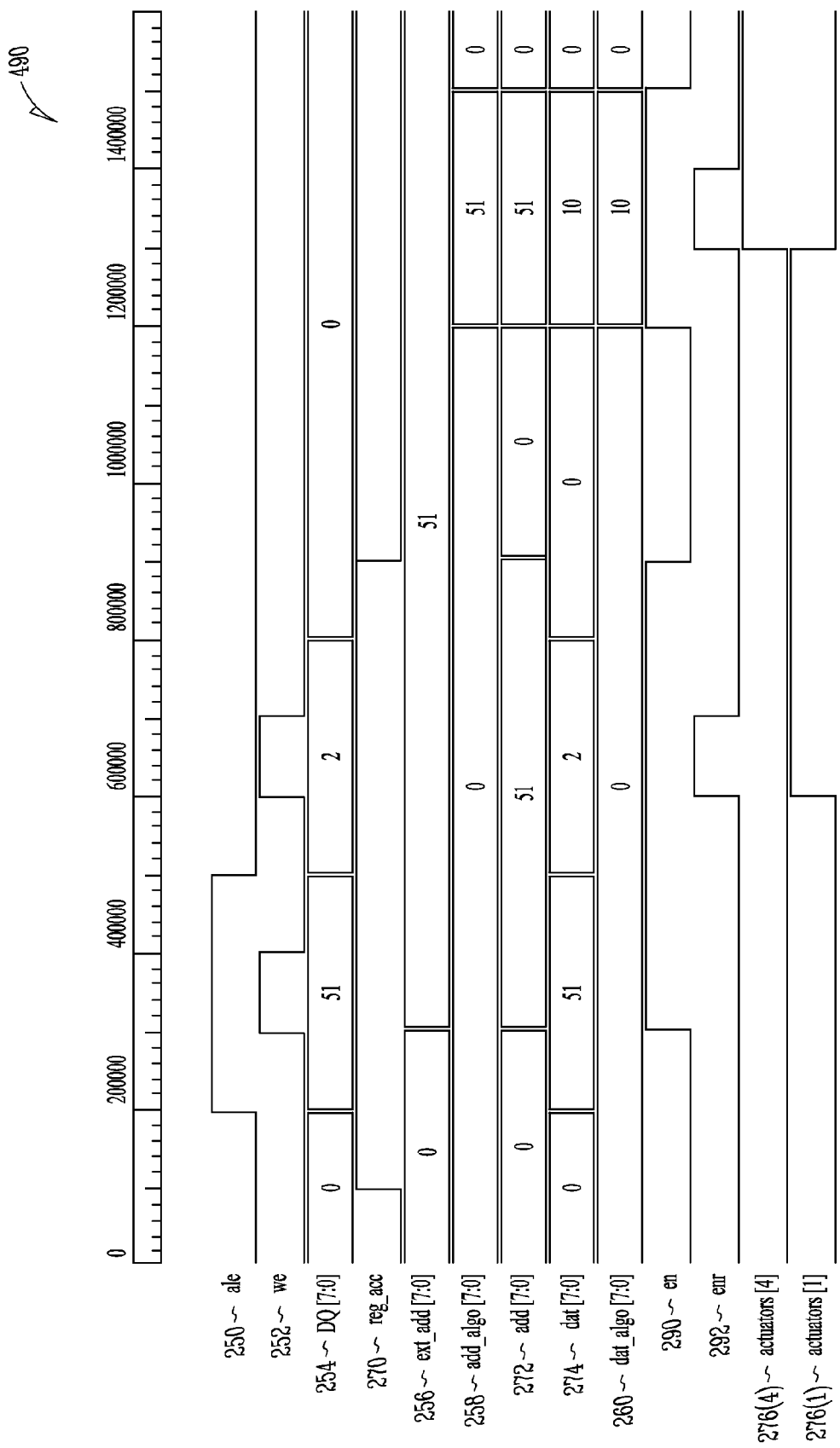
FIG. 4D illustrates a timing diagram for one or more example embodiments of register architectures.

FIG. 4D illustrates exemplary waveforms 490, obtained from electrical simulations, present at various points in register architecture 200 over time. Exemplary waveforms 490 in FIG. 4D include ALE signal 250, WE signal 252, DQ(n) signal 254, signal 270 (rec_acc), signal 256 (ext_add (n)), signal 258 (add_algo(n)), signal 272 (add(n)), signal 274 (dat(n)), signal 260 (dat_algo(n)), signal 290 (en), signal 292 (enr). FIG. 4D also includes signal 276(4) and signal 276(1) (provided as outputs from exemplary register 51 bits 4 and 1 respectively and corresponding to signals 460 and 462 of FIG. 4C).

Figure 5A:
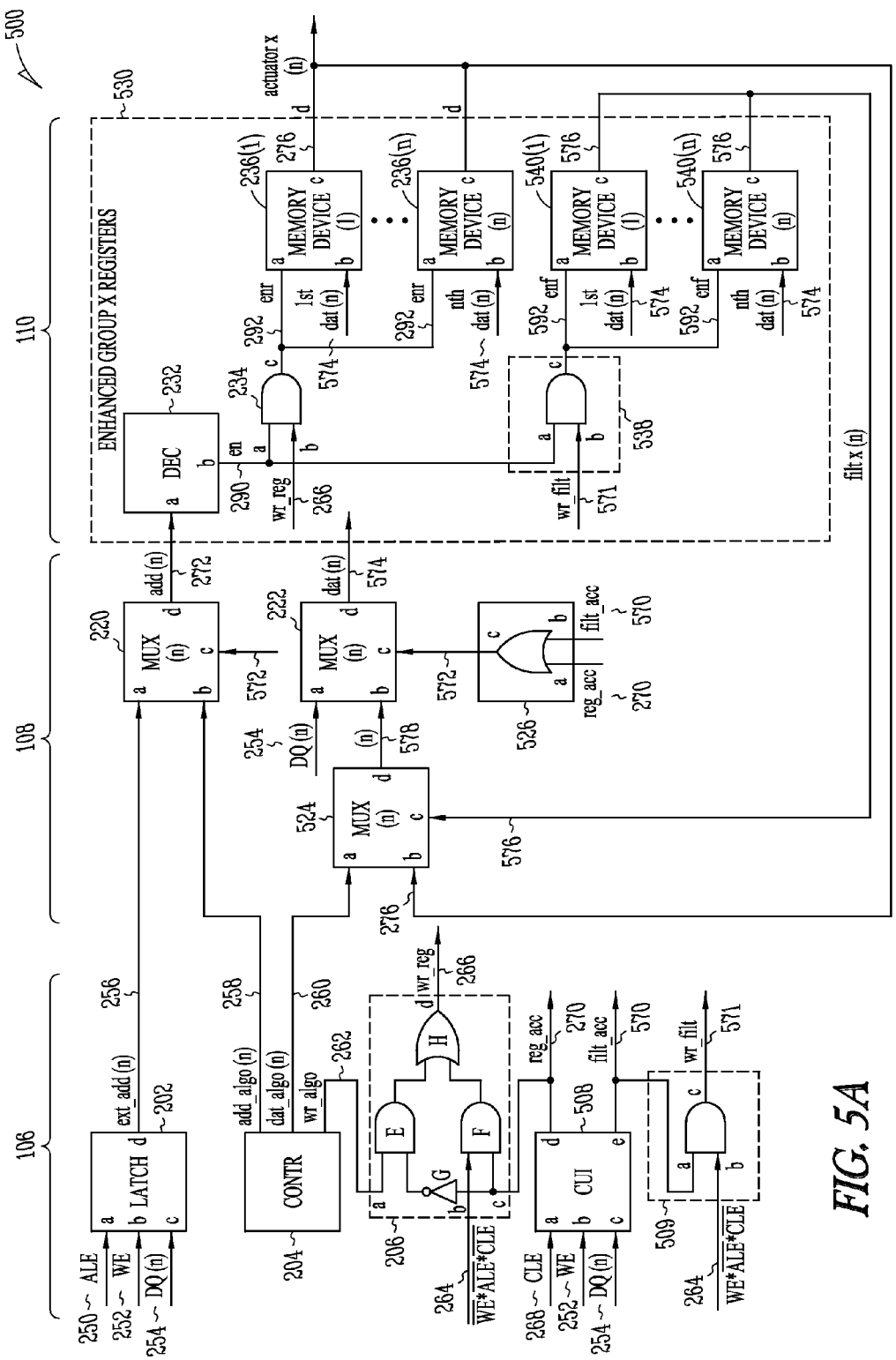
FIG. 5A illustrates a functional block diagram of an example embodiment of an enhanced register architecture including filtered registers.

FIG. 5A illustrates a block diagram of register architecture 500. Register architecture 500 includes latch 202, controller 204, logic circuit 206, MUX(n) 220, MUX(n) 222, decoder 232, logic circuit 234, and memory devices 236(1) through 236(n) as described above with respect to FIG. 2. In various embodiments, latch 202, controller 204, logic circuit 206, MUX(n) 220, MUX(n) 222, decoder 232, logic circuit 234, and memory devices 236(1) through 236(n) receive and provide one or more of the same signals as described above with respect to FIG. 2.

In addition, register architecture 500 includes Command User Interface (CUI) 508, logic circuit 509, MUX(n) 524, logic circuit 526, enhanced group x registers 530, logic circuit 538, and memory devices 540(1) through 540(n).

Figure 5B:
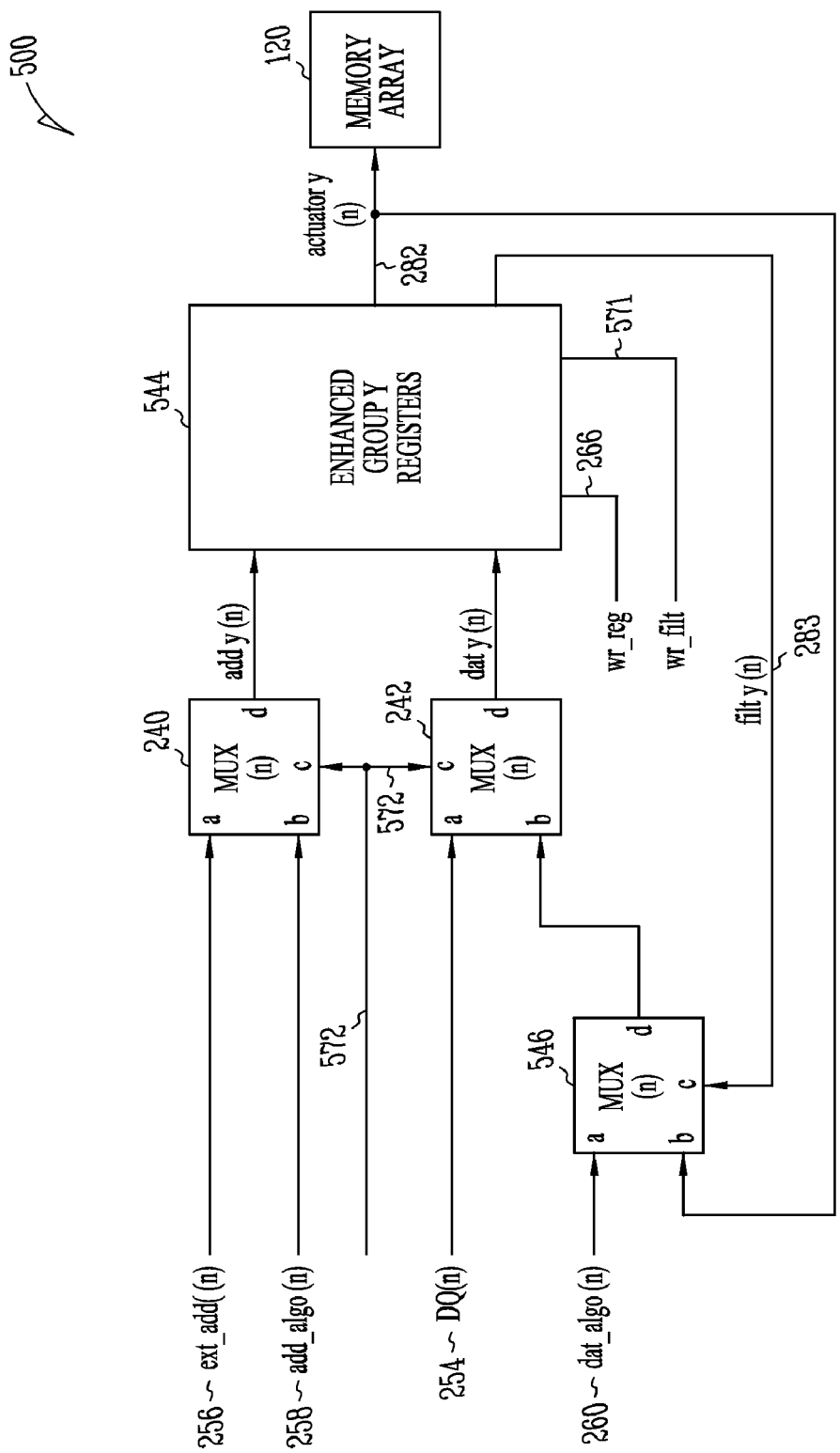
FIG. 5B illustrates a functional block diagram of an example embodiment of an enhanced register architecture including filtered registers.

In various embodiments, register architecture 500 also includes enhanced group y registers 544 and associated multiplexers and memory devices, as shown in FIG. 5B. For the sake of simplicity, the details of these devices are similar or the same as described for enhanced group x registers 530, and so the details in FIG. 5B have been omitted. The enhanced group y registers 544 are not shown in FIG. 5A for the sake of simplicity. However, in various embodiments, enhanced group y registers 544 would include all of the features described with respect to enhanced group x registers 530. In various embodiments, enhanced group y registers 544 would be coupled to signal 256, 258, 572, 254, and 260 through multiplexers MUX(n) 240, MUX(n)242, and MUX(n) 546 as shown in FIG. 5B. As also shown in FIG. 5B, enhanced group y registers 544 would also receive signals 266 and 571, and would provide signal 282 (actuator y (n)) and signal 283 (filt y (n)).

Returning to FIG. 5A, latch 202 receives the ALE signal 250, the WE signal 252, and the DQ(n) signal 254, and provides latched address signals at output 202d as signal 256 to MUX(n) 220. Controller 204 may provide addresses as signal 258 (add_algo(n)). Depending on the status of signal 572 at input 220c of MUX(n) 220, MUX(n) 220 will provide either the latched address signals or the address signals from controller 204 to decoder 232.

In register architecture 500, CUI 508 receives CLE signal 268 at input 508a, WE signal 252 at input 508b, and DQ(n) signal 254 at input 508c. CUI 508 provides signal 270 (reg_acc) at output 508d. In addition, CUI 508 provides signal 570 (filt_acc) at output 508e. Signal 570 is not limited to any particular type of signal. In one embodiment, signal 570 is a digital signal. In various embodiments, signal 570 is a filter access (filt_acc) signal.

Logic circuit 509 receives signal 570 at input 509a. Logic circuit 509 receives combinational signal 264 at input 509b. Logic circuit provides signal 571 at output 571c. Logic circuit 509 is not limited to any particular type of logic circuit. In an embodiment, logic circuit 509 is an AND logic circuit, wherein signal 570 and signal 264 are logically ANDed to provide signal 571. Signal 571 is not limited to any particular type of signal. In an embodiment, signal 571 is a digital signal. In various embodiments, signal 571 is a write filter (wr_filt) signal.

Logic circuit 526 receives signal 270 (reg_acc) at input 526a, and receives signal 570 (filt_acc) at input 526b. Logic circuit 526 provides signal 572 at output 526c. Logic circuit 526 is not limited to any particular type of logic circuit. In an embodiment, logic circuit 526 is an OR logic circuit, wherein signal 270 and signal 570 are logically ORed to provide signal 572. Signal 572 is not limited to any particular type of signal. In an embodiment, signal 572 is a digital signal. If present, MUX(n) 240 and MUX(n) 242 (as shown in FIG. 5B), as these multiplexers would be coupled to enhanced group y registers 544, are also provided with signal 572.

Multiplexer MUX(n) 524 receives signal 260 (dat_algo(n)) at input 524a. Signal 260 includes data signals provided by controller 204. MUX(n) 524 receives signal 276 (actuators (n)) at input 524b. Signal 276 represents the status of the actuator signals present at output 530d of enhanced group x registers 530. MUX(n) 524 receives signal 576 at input 524c.

Signal 576 includes a filter signal associated with each of the actuator signals included in signal 276. Based on the status of each of the filter signals provided in signal 576, MUX(n) 524 will provide at output 524*d* either a status associated with a particular signal line provided in signal 260 from controller 204, or a status associated with a particular signal line provided by signal 276 from enhanced group x registers 530. MUX(n) 524 determines which signal is to be provided at output 524*d* on signal line by signal line basis, wherein the determination as to which signal to provide at output 524*d* for any one signal line is individually determined based on the status of the associated filter signal line received as signal 576 at input 524*c*.

By way of example, in an embodiment where enhanced group x registers 530 includes eight actuator lines represented as lines <7:0>, signal 276 would include eight signals lines, one for each of lines <7:0>. Signal 576 would also include eight lines, one line in signal 576 associated with each of the eight actuator lines in signal 276, that is, one line associated with each of lines <7:0>. Signal 260 would include eight data lines provided by controller 204. MUX(n) 524 is capable of providing either the signal 260 or the signal 276 at output 524*d* on a individual signal line by signal line basis depending on the status of the input signals received at input 524*c*. For example, based on the status of the signal line provided in signal 576 and associated with the first signal line in signal 276, MUX(n) 524 will provide either the data line associated with the first data line in signal 260, or the signal associated with the first signal line from signal 276, as a first data line signal included in signal 578 (filtered data) at output 524*d*. MUX(n) 524 will provide, on an individual data line by data line basis, either the data line from the controller 204, or a signal line from signal 276, at output 524*d* for each of the data lines, based the status of each the signal lines provided to MUX(n) 524 at input 524*c*. The status of each signal line included in signal 578 at output 524*d* will be determined by the status of the associated signal line provided at input 524*c* as provided in signal 576 (filt x (n)).

As described above, MUX(n) 524 provides signal 578 at output 524*d*. However, signal 578 is not limited to any particular type of signal. Further, MUX(n) 524 is not limited to any particular type of multiplexer. Any type of multiplexer may be used that is capable of providing the signals as described above.

In register architecture 500, signal 578 is provided to MUX (n) 222 at input 222*b*. Depending on the status of the signal received by MUX(n) 222 at input 222*c*, either the signals received at input 222*b* from MUX(n) 524, or the signals received from external signal 254 (DQ(n)) will be provided by MUX(n) 222 to enhanced group x registers 530 and memory devices 236(1) through 236(*n*) as signal 574 (dat(n)).

The status of signal 572, controlling both MUX(n) 220 and MUX(n) 222, is determined by the status of signal 270 (reg_acc) and signal 570 (filt_acc). Both of these signals are provided by CUI 508, which controls the level provided by these signals as will be further described below.

Enhanced group x registers 530 includes decoder 232. DEC 232 provides signal 290 at output 232*b* to input 234*a* of logic circuit 234, and to a input 538*a* of logic circuit 538. Logic circuits 234 and 538 are not limited to any particular type of logic circuits. In various embodiments, logic circuits 234 and 538 are AND logic circuits. Logic circuit 234 receives signal 266 at input 234*b*, and provides signal 292 (enr x) at output 234*c* to memory devices 236(1) through 236(*n*). Logic circuit 538 receives signal 290 (enable) at input 538*a* from the decoder 232. Logic circuit 538 receives signal 571 (wr_filt) at input 538*b* from logic circuit 509. Logic circuit 538 provides signal 592 (enf) at output 538*c*. Signal 592 is not limited to any particular type of signal. In one embodiment, signal 592 is a digital signal.

Memory device 236(1) through 236(*n*) receive signal 292 at inputs 236*a* for each of memory devices 236(1) through 236(*n*), and a portion of signal 574 at inputs 236*b* of each memory device 236(1) through 236(*n*).

For example, memory device 236(1) receives the 1st component of the data provided as the dat(n) signal 574 at input 236(1)*b* of memory device 236(1). Each of the additional components of the dat(n) signal 574 are received at an input of one of the additional memory devices up to and including memory device 236(*n*). When the "enr x" signals 292 is provided, each of the components present in the dat(n) signal 574 will be latched into the one of the memory devices 236(1) through 236(*n*) to which the dat(n) signal 574 is coupled. Signal 574 is provided by the output 222*d* of MUX(n) 222.

Memory devices 236(1) through 236(*n*) provide actuator signal 276 by providing a signals at each output 236*c* from each of memory devices 236(1) through 236(*n*).

Memory devices 540(1) through 540(*n*) receive signal 592 at inputs 540*a* for each of memory devices 540(1) through 540(*n*), and a portion of signal 574 at inputs 540*b* for each of memory devices 540(1) through 540(*n*). For example, memory device 540(1) receives the 1st component of the data provided as the dat(n) signal 574 at input 540(1)*b* of memory device 540(1). Each of the additional components of the dat(n) signal 574 are received at an input of one of the additional memory devices up to and including memory device 540(*n*). When the "enf" signals 592 is provided, each of the components present in the dat(n) signal 574 will be latched into the one of the memory devices 540(1) through 540(*n*) to which the dat(n) signal 574 is coupled. Signal 574 is provided by the output 222*d* of MUX(n) 222.

In various embodiments, signal 574 differs from signal 274 of FIG. 2 in that signal 574 as provided by MUX(n) 222 may include data provided as external data signal 254 (DQ(n)), or data provided by signal 578 (filtered data) as provided by MUX(n) 524, as will be described in greater detail below. Memory devices 540(1) through 540(*n*) provide signal 576 (filt(n)) at the outputs 540*c* of each of memory devices 540(1) through 540(*n*).

Memory devices 540(1) through 540(*n*) are not limited to any particular type of memory device. In various embodiments, memory devices 540(1) through 540(*n*) are one or more flip-flop circuits. In various embodiments, memory devices 540(1) through 540(*n*) are the same type of memory devices as memory devices 236(1) through 236(*n*).

Figure 6:
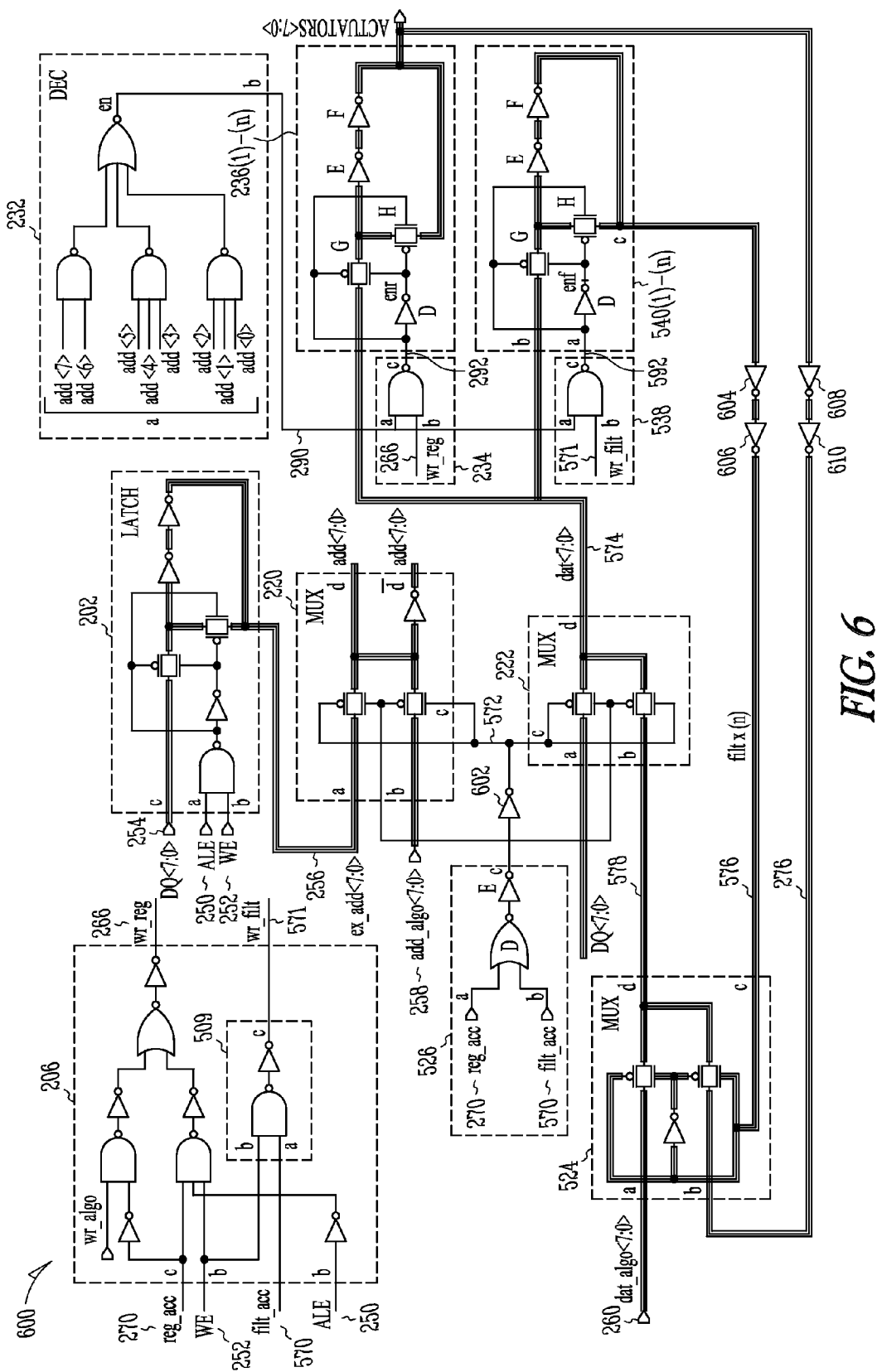
FIG. 6 illustrates a schematic diagram of one or more devices included in the exemplary embodiments of a register architecture reported in FIGS. 5A and 5B.

FIG. 6 illustrates a schematic diagram 600 of one or more functional blocks of register architecture 500. In various embodiments of register architecture 500, latch 202, logic circuit 206, MUX(n) 220, MUX(x) 222, DEC 232, logic circuit 234, and memory devices 236(1) through 236(*n*) include the elements as described above with respect to FIG. 3.

In FIG. 6, DEC 232 provides signal 290 to both logic circuit 234 and logic circuit 538. Logic circuit 538 also receives signal 571 at input 538*b*, signal 571 being provided by logic circuit 509 from output 509*c*.

MUX(n) 524 includes inputs 524*a* coupled to signal 260, input 524*b* coupled to signal 276, input 524*c* coupled to signal 576, and output 524*d* providing signal 578. Depending on the status of each of the signal lines included in signal 576, MUX(n) 524 will provide at signal 578 either the signal associated with the particular signal line provided as signal 260 at input 524*a*, or the signal associated with the particular signal line provided as signal 276 at input 524*b* on a signal line by signal line basis. Signal 578 from MUX(n) 524 is coupled to input 222b of MUX(n) 222. Thus, signal 578 represents a filtered data signal wherein one or more of the data lines may be provided by the data present in signal 276 when one or more filters are activated in memory devices 540(1) through 540(n).

MUX(n) 220 and MUX(n) 222 receive at input 220c and 222c respectively signal 572. Signal 572 is provided by logic circuit 526. Logic circuit 526 is not limited to any particular type of logic circuit. In various embodiments, logic circuit 526 includes a NOR logic circuit 526d and inverter logic circuit 526e. In various embodiments, output 526c is coupled to driver 602.

In various embodiments, memory devices 540(1) through 540(n) include logic elements 540d, 540e, and 540f, and pass gates 540g and 540h. Memory devices 540(1) through 540(n) receive signal 592 at inputs 540a at each memory device 540(1) through 540(n), and receive one of the signals 574 provided on the signal lines from MUX(n) 222 at each input 540b of memory devices 540(1) through 540(n). Memory devices 540(1) through 540(n) provide the individual signals included in signal 576 at each of the outputs 540c of memory devices 540(1) through 540(n). Signal 576 includes one or more individual signal lines associated with each of the signal lines included in signal 276. The signal lines included in signal 576 are provided to input 524c of MUX(n) 524 and determine the coupling of signal 260 and signal 276 to signal 578 through MUX(n) 524, as described above.

In various embodiments, signal 276 and signal 576 may include drivers 604, 606, 608, and 610, as shown in FIG. 6.

In operation, register architecture 500 may operate in, but is not limited to, a user mode or a test mode. The test mode in various embodiments may include a register access test mode and a filter access test mode, or both. In various embodiments, when register architecture 500 is in user mode, and the filters (for example memory devices 540(1) through 540(n) as explained below) have not been activated, enhanced group x registers 530, (and enhanced group y register 544 if present) are written to by the controller 204. When register architecture 500 is in test mode, enhanced group x registers 530, (and enhanced group y registers 544 if present) are written to by a processor, such as the processor 102 of FIG. 1, or a tester or a programmer or some other programming device, as described above. However, when register architecture 500 is in user mode and one or more filters have been activated as described below, enhanced group x registers 530 (and enhanced group y registers 544 if present) may be written to by controller 204 for only the individual actuator signals included in signal 276 (and signal 282 provided by the actuator signal from enhanced group y registers 544 if present) for which a corresponding filter has not been activated. For individual actuator signals within signal 276 (or actuator signals within signal 282) for which a filter has been activated, the status of these individual actuator signal will be maintained at its stored status value despite the controller providing data which would normally overwrite the individual actuator signal line status if the filter for these lines had not been activated.

Operation of register architecture 500 is now further described by referring to FIGS. 5A and 5B, FIG. 7A, and FIG. 7B. In FIG. 5A, CUI 508 is designed to recognize if a particular code provided on one or more external signal lines, for example CLE signal 268, WE signal 252, and DQ(n) signal 254, is a user command or if it is a test mode entry request. In addition, CUI 508 is designed to recognize if a particular code on these externally supplied signal lines is a request to set, and thus activate, one or more filters, as will be described in more detail below.

Figure 7A:
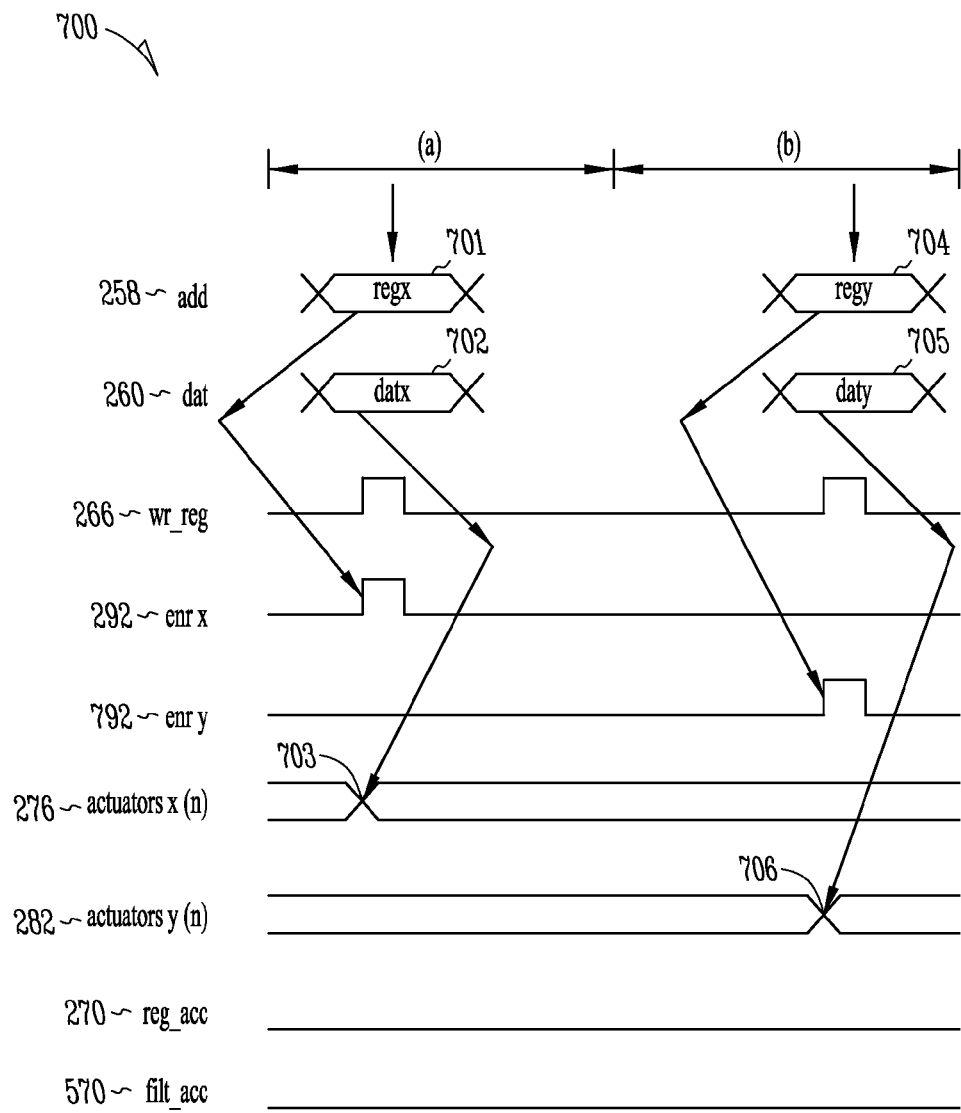
FIG. 7A illustrates a timing diagram for one or more example embodiments of register architectures operating in a first mode and including a filtered register architecture.

Assuming that CUI 508 has not detected any signals that indicate a test mode or that indicate a request to set filters, CUI 508 will set signal 270 (reg_acc) to a particular setting representative of user mode, for example but not limited to the setting as shown in FIG. 7A for the time prior to time period "(a)". In one embodiment, signal 270 (filt_acc) will be set to a level corresponding to a digital "zero." During this time, signal 570, the signals representing a filter setting mode, will also be set to a particular setting representative of user mode. With signal 270 and signal 570 set as described above for a user mode, MUX(n) 220, MUX(n) 222, and MUX(n) 524 will be arranged as follows. Since neither signal 270 nor signal 570 are set "high," signal 572 from logic circuit 526 will be at a level that will cause MUX(n) 220 to switch to input 220b, and provide signal 258 at output 220d. In this mode, controller 204 will provide addresses through MUX(n) 220 to decoder 232. Signal 572 from logic circuit 526 will also be provided to MUX(n) 222, and will cause MUX(n) 222 to switch to input 222b, and thus provide signal 578 at output 222d. Assuming that no filters have been activated in memory devices 540(1) through 540(n), signal 576 (filt(n)) will be at a level that will cause MUX(n) 524 to switch each of the individual data lines included in the data signals provided to MUX(n) 524 to input 524a to output 524d. In this mode, controller 204 will provide data, as signal 260 (data_algo(n)), to MUX(n) 524, which in turn will be provided from controller 204 as signal 578 at output 524d to MUX(n) 222 at input 222b. This data signal from controller 204 will then be provided at output 222d as signal 574 (dat(n)) to memory devices 236(1) through 236(n). In conjunction with signal 266 (wr_reg) provided from controller 204, memory devices 236(1) through 236(n) will proceed to latch the data signals provided by controller 204 to memory devices 236(1) through 236(n) as described above with respect to FIG. 5A.

Returning to FIG. 5A, signal 574 including the data from controller 204 is also supplied to memory devices 540(1) through 540(n). However, this data will not be written into memory devices 540(1) through 540(n), even when decoder 232 provides enable signal 290 and controller 204 provides wr_reg strobe signal 266, because each of the enable inputs of memory devices 540(1) through 540(n) are coupled to logic circuit 538. Logic circuit 538, while coupled to decoder 232, will only provide enable signal 592 when also receiving a wr_filt strobe on signal 571. As indicated above, signal 570 from CUI 508 remains inactive or "low" during user mode. Signal 570 is an input to logic circuit 509 and provides the wr_filt signal 571, which controls the second input to logic circuit 538, and in turn provides the enable input to memory devices 540(1) through (n). However, with signal 570 remaining low, no wr_filt signal 571 may be provided through logic circuit 509, and thus controller 204 is unable to write to or erase any data stored in memory devices 540(1) through 540(n).

Therefore, the output of memory devices 540(1) through 540(n), i.e. signal 576, will remain unchanged while controller 204 writes and rewrites data to memory devices 236(1) through 236(n), because memory devices 540(1) through 540(n) will not be receiving a level of signal 592 that would allow the data from signal 574 to be incorporated into memory devices 540(1) through 540(n). Thus, controller 204 is able to write and re-write any of the register locations associated with enhanced group x registers 530 that provide actuator x signal 276, but is unable to write or erase the setting stored in memory devices 540(1) through 540(n).

In addition to the user mode, register architecture 500 may operate in test mode. CUI 508 is capable of detecting that a test mode is desired based on the external signals as described above. Detection of a test mode is not limited to any particular signal or sequence of signals. When CUI 508 determines that the register access test mode is desired, CUI 508 will change signal 270 to indicate a test mode. In various embodiments, the change in signal 270 represents a register access test mode.

When CUI 508 determines that the register access test mode is desired, CUI 508 will provide a signal at output 508*d* to indicate the register access test mode. In an embodiment, signal 270 provided at output 508*d* is a digital signal, and will change level to indicate the register access test mode. When signal 270 changes levels to indicate the register access test mode, signal 270 as provided at input 526*a* of logic circuit 526 will cause a corresponding change in signal 572 provided at output 526*c* of logic circuit 526. This change in signal 572 will cause the following changes with regards to MUX(n) 220 and MUX(n) 222. MUX(n) 220 will switch to input 220*a*, and thus provide signal 256 at output 220*d* of MUX(n) 220. In this mode, latch 202 will provide addresses provided on external DQ(n) signal 254 through MUX(n) 220 to decoder 232. MUX (n) 222 will switch to input 222*a*, and thus provide signal 254 (DQ(n)) at output 222*d*. In this mode, data signals will be provided from an external source, such as a tester (not shown) through signal 254, through MUX(n) 222, and to memory devices 236(1) through 236(*n*) as signal 574. In conjunction with signal 266 (wr_reg), the external signals may proceed to write the data signals provided as DQ(n) signal 254 to one or more memory devices, for example, memory devices 236(1) through 236(*n*). Memory devices 236(1) through 236(*n*) will in turn supply the status of the data stored in memory devices 236(1) through 236(*n*) as actuator signal 276.

Again assuming that no filters have been set in memory devices 540(1) through 540(*n*), signal 576 (filt(n)) will be at a level that will cause MUX(n) 524 continue to couple each signal line included in signal 260 at input 524*a* to output 524*d*, and thus couple any data provided by controller 204 as signal 260 to output 524*d*. However, since output 524*d* is coupled to input 222*b* of MUX(n) 222, and MUX(n) 222 is switched to receive data from input 222*a*, any data provided by controller 204 will not be coupled to memory devices 236(1) through 236 (*n*), even when these memory devices receive an enable signal on signal 292.

In addition, in register access test mode, no filter setting will be written into, and no existing filter setting present in memory devices 540(1) through (*n*) may be altered. While any data provided on the DQ(n) signal 254 during the register access test mode would be coupled to the data inputs of memory devices 540(1) through 540(*n*) through MUX(n) 222 to each input 540*b* of memory devices 540(1) through 540(*n*), no enable signals will be provided at signal 571 to cause the data to be written into memory devices 540(1) through 540 (*n*). As noted above with respect to user mode, signal 570 for CUI 508 remains inactive or "low" during the register access test mode, and thus a wr_filt signal 571 as provided by logic circuit 509 will also remain low. Therefore, during a test mode, an external tester, programmer, or processor may write, erase and rewrite any of the data in memory devices 236(1) through 236(*n*) without having any effect on the filter settings stored in memory devices 540(1) through 540(*n*).

In addition to user mode and register access test mode, register architecture 500 may operate in a filter setting mode. CUI 508 may determine that one or more filters are to be set for one or more actuator signal lines included in signal 276 and associated with enhanced group x registers 530 (or in signal 282 as associated with enhanced group y registers 544). A determination that a filter setting mode is desired is not limited to any particular signal or sequence of signals. In one embodiment, CUI 508 determines that one or more filters are to be set based on signals 268, 252, and 254 received at inputs 508*a*, 508*b*, and 508*c*, respectively, of CUI 508.

When CUI 508 determines that filters are to be set, CUI will change signal 570 (filt_acc) to indicate a filter setting mode. In various embodiments, when a filter setting mode is activated, CUI 508 may also set reg_acc signal 270 to an inactive or "low" state.

Because logic circuit 526 receives the filt_acc signal 570, logic circuit 526 will again set signal 572 as described above with respect to register access test mode, causing MUX(n) 220 to switch to input 220*a* to receive addresses from the externally supplied signals, and setting MUX(n) 222 to switch to input 222*a* to receive data from external signals DQ(n) signal 254.

In addition, the change in the level of signal 570 will be provided to logic circuit 509, at input 509*a*. Logic circuit 509 also receives combinational signal 264 (WE*ALE(bar)*CLE (bar)) at input 509*b*. When signal 570 indicates filters are to be set, and combinational signal 264 provides an enabling signal level at input 509*b*, logic circuit 509 will provide a change in the logic level of signal 571 (wr_filt). This change in the logic level of signal 571 is provided to logic circuit 538, and in conjunction with the enable signal 290 from decoder 232, will cause a level change in signal 592 (enf). This change in signal 592 will enable memory devices 540(1) through 540(*n*) to accept data as provided at inputs 540*b*, for each of memory devices 540(1) through 540(*n*), and to incorporate the data as stored into memory devices 540(1) through 540(*n*) at the outputs of memory devices 540(1) through 540(*n*) as signal 576.

Thus, in filter setting mode, signal 576 will be set based on the data provided by signal 574 and stored into memory devices 540(1) through 540(*n*), the data as is provided by signal 574 (dat(n)) at the inputs 540*b* at the time this data is provided in conjunction with the write filter enable signal 571. At this time, the data supplied as signal 574 corresponds to signal 254 (DQ(n)) being provided through MUX(n) 222 as signal 574. Thus, memory devices 540(1) through 540(*n*) will be set to the level of signal 254 whenever the signal 571 (wr_filt) is active in conjunction with signal 290 provided by decoder 232. Thus, in filter mode, external signals may be used to write data to memory devices 540(1) through 540(*n*). The status of the data stored in memory device 540 is provided by memory devices 540(1) through (*n*) at output 540*c* as signal 576. Signal 576 is received at input 524*c* of MUX(n) 524, and will cause MUX(n) 524 to switch, on a signal line by signal line basis, either the signal at the 524*a* input or the signal at the 524*b* input to the 524*d* output of MUX(n) 524.

By way of example, for any signal line in actuator signal 276 for which a filter is to be activated, a high level may be stored into the data bit of the one of memory devices 540(1) through 540(*n*) that corresponds to the signal line of actuator signal 276. For any of the data bits set high, a high level signal will be provided on the line of filter signal 576 at the corresponding output 540*c*. Filter signal 576 controls MUX(n) 524, and high signals provided by signal 576 will cause MUX(n) 524 to switch the particular signal line associated with the high signal so that the MUX(n) 524 couples the output at 524*d* for the particular signal line to the 524*b* input, which provides the status of the current outputs from each of the signal lines included in actuator signal 276.

In effect, memory devices 540(1) through 540(*n*), which control the switching of MUX(n) 524, has "latched" the state of one or more signal lines included in signal 276 to be maintained at whatever value is presently stored in memory devices 236(1) through (*n*) for each of the signal lines for which a filter has been activated through the storage of a set of data values into memory devices 540(1) through 540(n).

After one or more filter settings are stored in memory devices 540(1) through 540(n), CUI 508 may deactivate signal 570 (filt_acc) (and if activated, signal 270 (reg_acc)). Deactivation of both signal 270 and signal 570 will cause the signal provided at the output of logic circuit 526 to change to a level indicative of user mode. As a result, MUX(n) 220 will switch to input 220b, again allowing controller 204 to provide addresses to decoder 232 by providing signal 258 as the add(n) signal 272 provided at output 220d. MUX(n) 222 will switch to input 222b, providing signal 578 as data to output 222d as signal 574 (dat(n)). However, MUX(n) 524 is now controlled by signal 576 as set during the filter setting mode. Therefore, MUX(n) 524 provides as a data signal the output signal 578 now "filtered" by coupling, on a signal line by signal line basis, signal lines from input 524b for signal lines having filters activated, and signal lines from input 524a as supplied by controller 204 for signal lines not having the filters activated.

As a result of this filtering of the data by MUX(n) 524, controller 204 is only able to write and rewrite data to the actuator signals included in actuator signal 276 for which filters have not been activated. For any signal lines included in actuator signal 276 for which a filter has been set, even after returning to user mode, the output value associated with each of these actuator signal 276 lines is maintained at whatever value was present on the lines when the filter for that line was last activated in the filter setting mode.

FIG. 7A shows a timing diagram 700 of signals for a write operation for register architecture 500 in user mode, wherein no filters have been activated. During the entire time period, reg_acc signal 270 and filt_acc signal 570 remain low, indicating that the register architecture is in user mode. During the time period designated as time surrounding "(a)" in FIG. 7A, controller 204 provides an addresses as signal 258 (e.g., add_algo(n)) in FIG. 5A) that includes an address 701 that corresponds to enhanced group x registers 530. The address is represented as "regx" in FIG. 7A. Since reg_acc signal 270 is low, this address data will travel along a path including MUX(n) 220 to decoder 232 as described above with respect to FIG. 5A. Decoder 232 will decode the address signal, and because the address 701 corresponds to the enhanced group x registers 530, decoder 232 will provide an "en" signal as signal 290.

During this same time period, controller 204 will provide data 702 on signal 260 (e.g., dat_algo(n) in FIG. 5A). The signal 260 includes one or more data bits to be written to enhanced group x registers 530. The data is represented as "datx" in FIG. 7A. Since both the reg_acc signal 270 and the filt_acc signal 570 are low, this data will travel along a path through MUX(n) 524 and MUX(n) 222, and be provided as dat(n) signal 574 at inputs 236b of each of memory devices 236(1) through 236(n). When provided with the wr_reg signal 266, the enr 292 signal will activate, and all of the data provided by controller 204 will be written into memory devices 236(1) through 236(n). This is represented by the inflection point 703 in signal 276.

A similar process is show in FIG. 7A relating to controller 204 writing data to enhanced group y registers 544 in user mode. During the time period surrounding the time designated as "(b)" in FIG. 7A, controller 204 provided address 704, shown as "regy" and relating to the address of enhanced group y registers 544. During this time period, controller 204 also provides data 705, shown as "daty" and relating to data to be written to enhanced group y registers 544. The wr_reg signal 266 is provided to logic circuitry (not shown but included as part of enhanced group y registers 544) to produce enr signal 792, causing the data provided by controller 204 as data 705 to be written to the memory device or devices included in the enhanced group y registers 544. This is represented by the inflection point 706 in signal 282.

Because no filters have been set in the time frames represented by "(a)" and "(b)" of FIG. 7A, one or more algorithms may be executed by controller 204 that cause controller 204 to write and re-write any one of the data bits as represented by "datx" and "daty" to any of enhanced group x registers 530 or enhanced group y registers 544 respectively.

Figure 7B:
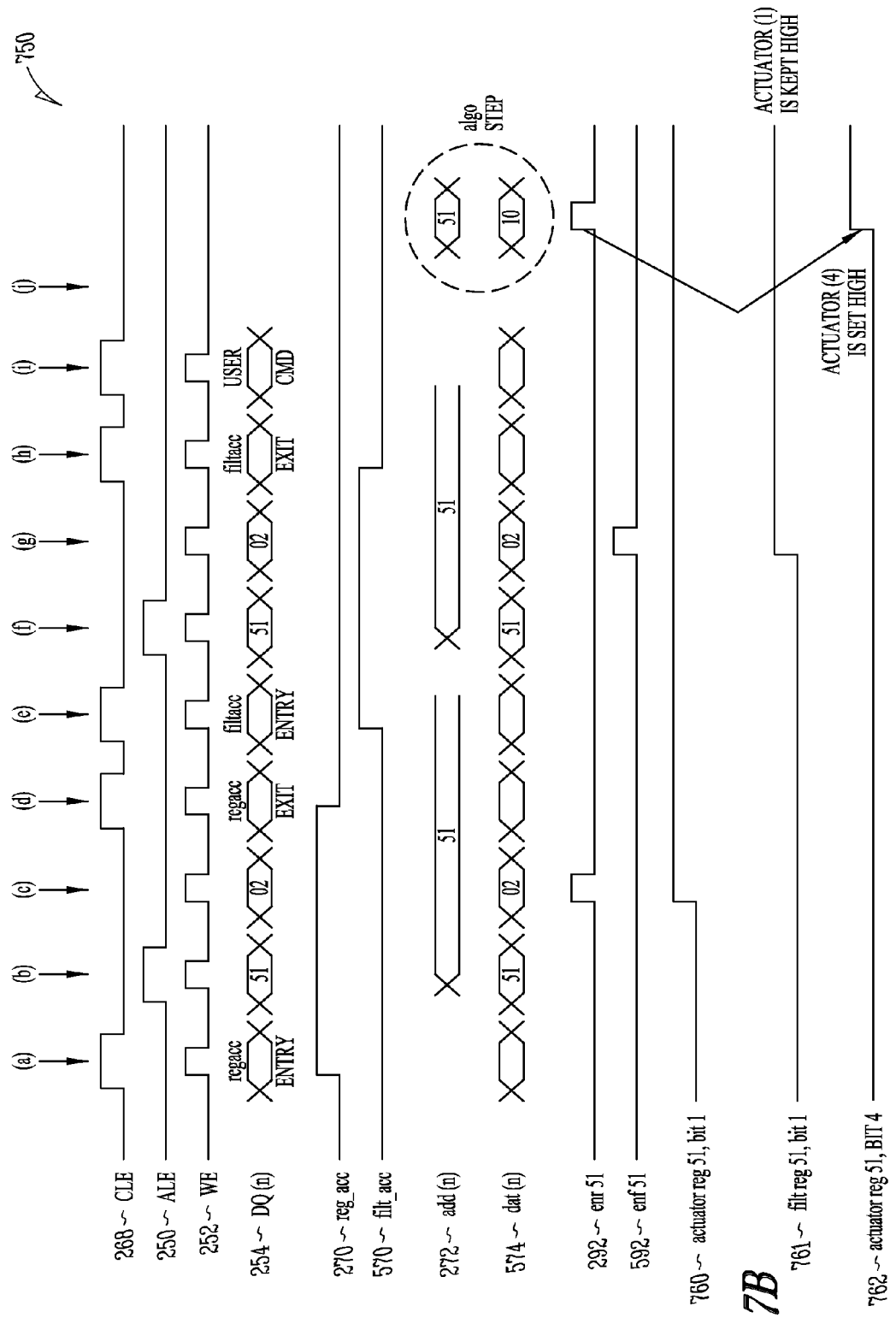
FIG. 7B illustrates a timing diagram for one or more example embodiments of register architectures including a filtered register architecture.

FIG. 7B illustrates waveforms 750 representing how application of a filter to one or more actuator signal lines prevents the controller from overwriting the setting of the actuator signal lines in a subsequent user mode. FIG. 7B illustrates first setting the value of the actuator signals in a register access test mode, then setting a filter for the actuator signal lines in a filter setting test mode, and finally retaining the settings of the actuator signals for which filters have been set while operating in a user mode, as further described below.

In FIG. 7B around time period "(a)" the combination of the CLE signal 268, the WE signal 252, and the DQ(n) signal 254, indicate that a request to enter the register access test mode is being made. In response, signal 270 (reg_acc) changes state to indicate that the register access test mode exists. Time periods "(b)" and "(c)" and "(d)" represent respectively addressing a register (for example a register "51" as shown by signal 254), writing data to the register (for example hexadecimal data 02, represented as binary 0000 0010), and exiting the register access test mode. In various embodiments, example register 51 is enhanced group x registers 530 or enhanced group y registers 544. As shown for the time period surrounding time period "(c)" writing data to register 51 includes a strobe signal occurring on signal 292 and sets actuator 51, bit 1 high, and sets actuator 51, bit 4 low, as shown in FIG. 7B by signals 760 and 762 respectively.

In various embodiments, time period "(e)" represents a request to enter a filter setting mode. For example, based on CLE signal 268, WE signal 252, and DQ(n) signal 254, CUI 508 determines that a filter setting mode is being requested. No particular signals are required to indicate a filter setting mode is being requested. Once CUI 508 determines that a filter setting mode is desired, the level of signal 570, the filt_acc signal, is changed from low to high, indicating that a filter setting mode has been entered. In addition, CUI 508 will set signal 270, the reg_acc signal, to a low state.

Time periods "(f)," "(g)," and "(h)" represent respectively addressing a filter register (for example a filter register associated with register "51" as shown by signal 254) and writing data to the filter register (for example hexadecimal data 02, represented as binary 0000 0010), and exiting the filter setting mode. The filter register is the filter register including a data bit associated with each of the actuator signal lines controlled by the data stored in register 51. "Associated with" refers to the a memory device in the filter register storing a bit or a status that indicates whether a filter has been activated for one particular memory device providing at least one signal line of an actuator signal output. In various embodiments, the filter register is memory devices 540(1) through 540(n) included in enhanced group x registers 530. In various embodiments, there is a data bit stored in memory devices 540(1) through 540(n) associated with each one of the memory devices included in memory devices 236(1) through 236(n).

During time period (f), the address data on signal 254 represents the same address, specifically "51" as addressed in the previous register access test mode. However, since the filt_acc signal 570 is now high when data is provided during the time period "(g)" a strobe on the WE signal 252 (WE) causes a corresponding strobe on the enf signal 592, allowing the data provided on signal 254 to be written to the filter register 51 rather than the 51 register used to provide the actuator signals. As shown in FIG. 7B, example hexadecimal data 02, represented as binary 0000 0010, is written to the filter register. This filter setting sets a filter for the actuator signal associated with the bit "1" as shown by signal 761 changing state from low to high level, while not activating a filter for the remaining seven bits associated with the zero values stored in the filter register.

After exiting the filter setting mode, and at time period "(i)" in FIG. 7B, it is determined that a user mode is to be entered. During this time period, reg_acc signal 270 and filt_acc signal 570 remain low. As noted above, in a user mode the controller 204 will attempt to write and re-write the data stored in the registers providing the actuator signals, for example register 51. By way of example, at a time period represented by "(j)" in FIG. 7B, an address and data are provided that attempt to write a data value of hexadecimal 10, represented by binary 0001 0000, to register 51. As shown by waveform 762, writing a hexadecimal value of 10 to register 51 causes bit 4 of register 51 to change from a low to a high level. However, while the data represented by a hexadecimal value of 10 would normally reset the bit 1 to a value of zero, because a filter has been set in the previous filter mode for this particular bit, the value of bit 1 of register 51 is not reset to a zero, and remains at a value of 1, as shown by signal 760 remaining high during and after time period "(j)".

Thus, once filters have been activated in, for example, memory devices 540(1) through 540(n) of FIG. 5A, a register providing actuator signals, such as memory devices 236(1) through 236(n) in FIG. 5A, will receive a "filtered" data input signal at inputs 236b, wherein data will be supplied by the controller 204 for data line where filters have not been activated, and data will be supplied from the actuator signals 276 for data lines where filters have been activated.

Thus, by activating one or more filters by providing filter setting to a filter register such as memory devices 540(1) through 540(n) during a filter setting mode, filtered data, such as provided in signals 578, may be applied to memory device such as memory devices 236(1) through 236(n), and thus maintain one or more setting applied during a non-user mode, such as the register access test mode, when subsequently returning to a user mode. The various embodiments described achieve this in a way that is completely transparent to the instruction and the algorithms included in the controller 204, and do not require any modification to the software or firmware included in controller 204.

Figure 7C:
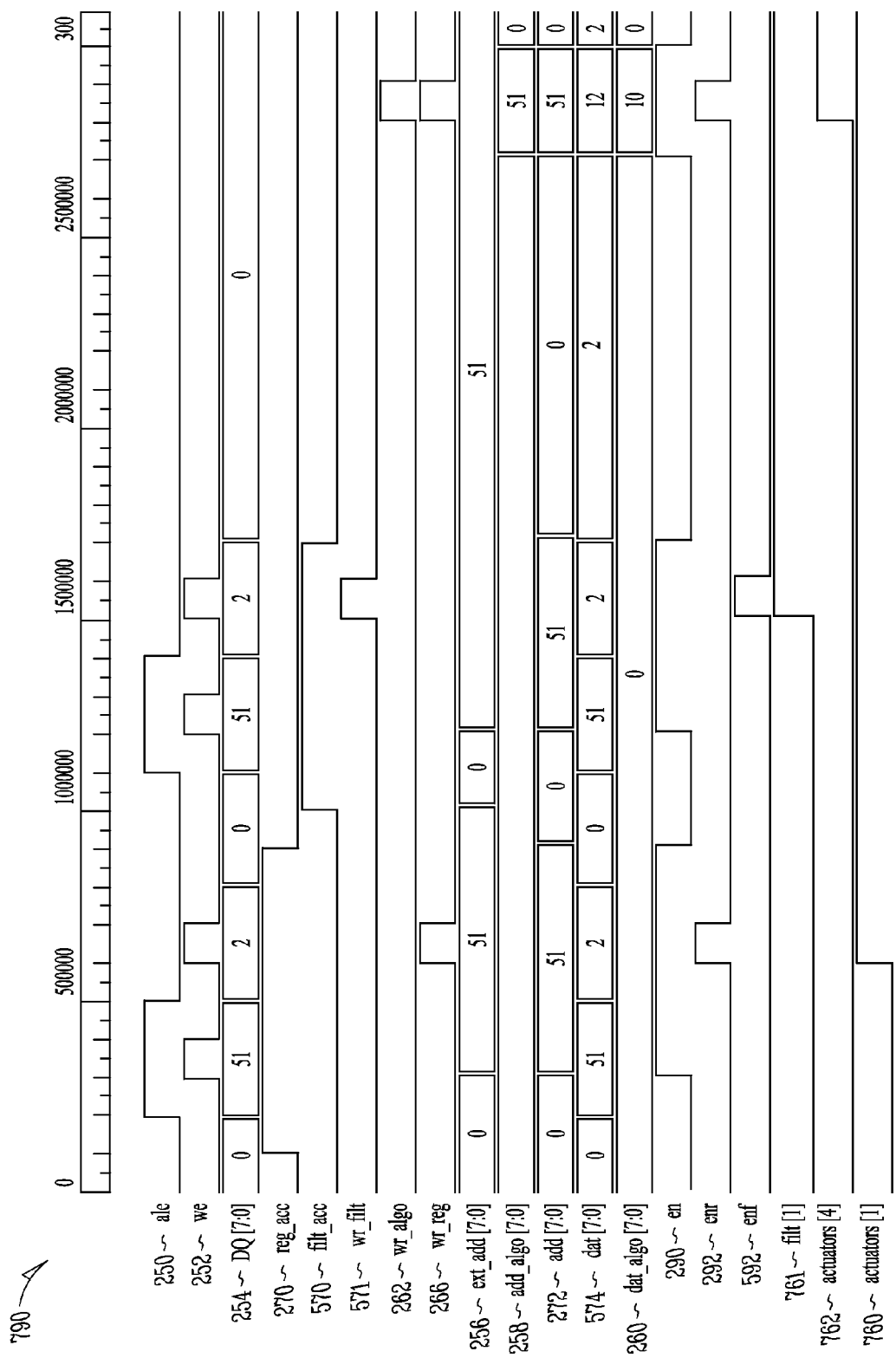
FIG. 7C illustrates a timing diagram (based on electrical simulations) for one or more example embodiments of register architectures operating in a second mode after a subsequent first mode and including a filtered register architecture.

FIG. 7C illustrates exemplary waveforms 790, obtained from electrical simulations, for a register architecture, for example register architecture 500, that includes enhanced group registers. FIG. 7C illustrates exemplary waveforms 790 present at various points in register architecture 500 over time. Exemplary waveforms 790 include ALE signal 250, WE signal 252, DQ(n) signal 254, signal 270 (reg_acc), signal 570 (filt_acc), signal 571 (wr_filt), signal 262 (wr_algo), signal 266 (wr_reg), signal 256 (ext_add (n)), signal 258 (add_algo(n)), signal 272 (add(n)), signal 574 (dat(n)), signal 260 (dat_algo(n)), signal 290 (en), signal 292 (enr), signal 592 (enf), signal 761 (filt[1]), signal 762 (actuators [4]), and signal 762 (actuator [1]).

Some embodiments include a number of methods. The activities included in these methods may be accomplished in a number of ways, and are not necessarily limited to a particular order or sequence for performing these activities.

Figure 8A:
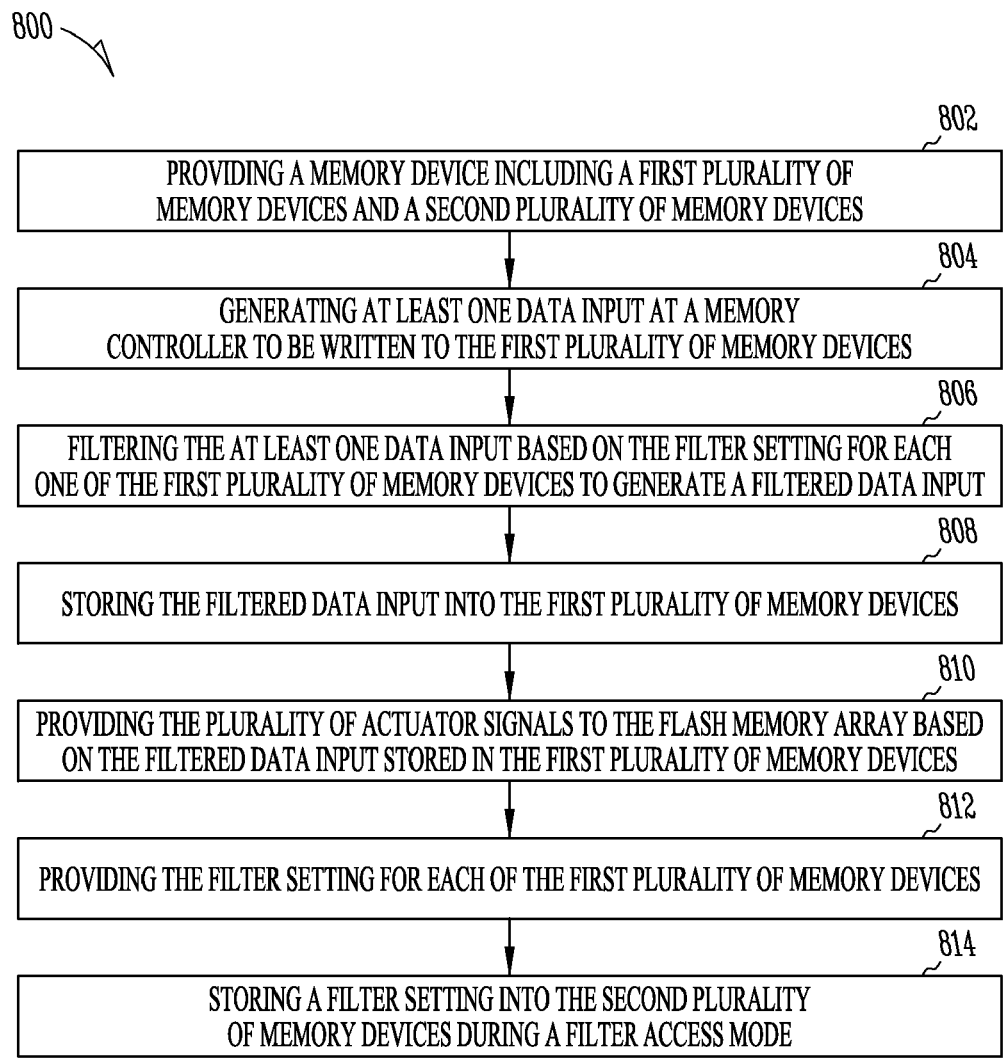
FIG. 8A is a flow chart illustrating several methods according to various embodiments.

For example, FIG. 8A is a flow chart illustrating several methods according to various embodiments. Various embodiments include a method 800 comprising providing a memory device including a first plurality of memory devices and a second plurality of memory devices at block 802, the first plurality of memory devices to provide a plurality of actuator signals to a flash memory array, the second plurality of memory devices to store a filter setting for each one of the first plurality of memory devices, generating at least one data input at a memory controller to be written to the first plurality of memory devices at block 804, filtering the at least one data input based on the filter setting for each one of the first plurality of memory devices to generate a filtered data input at block 806, storing the filtered data input into the first plurality of memory devices at block 808, and providing the plurality of actuator signals to the flash memory array based on the filtered data input stored in the first plurality of memory devices at block 810.

In various embodiments, method 800 further includes providing the filter setting for each of the first plurality of memory devices at block 812 by writing a status bit into each one of the second plurality of memory devices, the status bit to indicate whether a filter has been activated for a particular one of the first plurality of memory devices.

Method 800 may also further include storing a filter setting into the second plurality of memory devices during a filter access mode at block 814.

Method 800 may also include wherein filtering the at least one data input based on the filter setting includes for any status bit indicating that a filter has been activated for a particular one of the first plurality of memory devices, providing in the filtered data input as the bit to be stored into that same particular one of the first plurality of memory devices a signal level corresponding to a signal level at the output of that same particular one of the first plurality of memory devices.

Method 800 may also include wherein filtering the at least one data input based on the filter setting includes for any status bit indicating that a filter has not been activated for a particular one of the first plurality of memory devices, providing in the filtered data input as the bit to be stored into the particular one of the first plurality of memory devices a bit provided in the at least one data input that is directed to be stored into the particular one of the first plurality of memory devices.

Method 800 may also include wherein filtering the at least one data input includes providing a switching device including a first switching device input, a second switching device input, and a switching device output, the switching device output to provide the generated filtered data input.

Method 800 may also include wherein filtering the at least one data input includes receiving at the first switching device input the data input including a plurality individual data bits, each of the plurality of individual data bits directed to a particular one of the first plurality of memory devices, and for each of the particular one of the first plurality of memory devices for which a filter has not been activated, coupling the individual data bit directed to the particular one of the first plurality of memory devices to the switching device output.

Method 800 may also include wherein filtering the at least one data input includes receiving at the second switching device input a plurality of actuator signals, the plurality of actuator signals including an individual actuator signal provided by each one of the first plurality of memory devices, and for each one of the first plurality of memory devices for which a filter has been activated, coupling the individual actuator signal provided by each one of the first plurality of memory devices to the switching device output.

Method 800 may also include wherein storing the filtered data input into the second plurality of memory devices includes latching individual data bits included in the filtered data input into a plurality of flip-flop circuits.

Figure 8B:
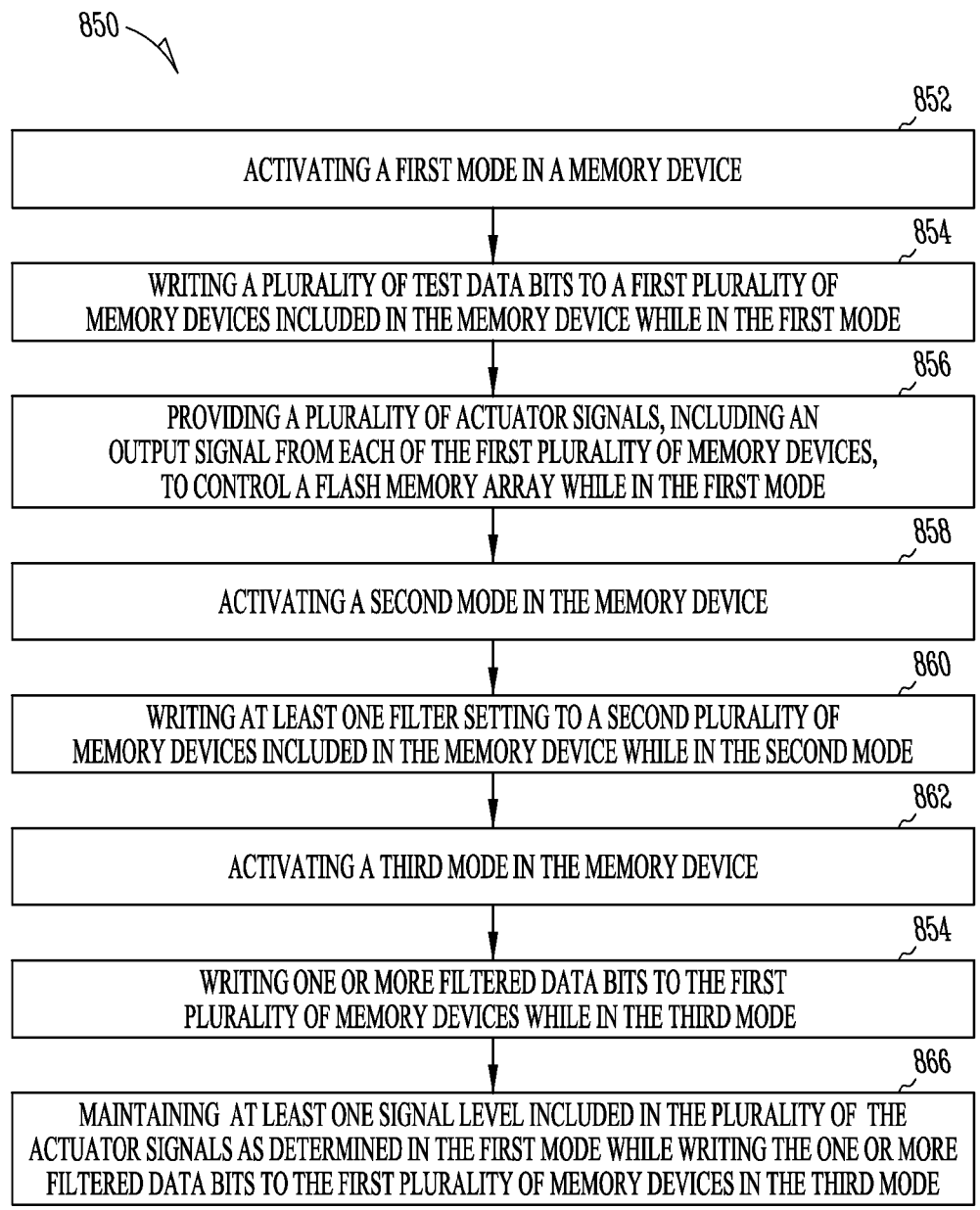
FIG. 8B is a flow chart illustrating several methods according to various embodiments.

In a further example, FIG. 8B is a flow chart illustrating several methods according to various embodiments. Various embodiments include a method 850 comprising activating a first mode in a memory device at block 852, writing a plurality of test data bits to a first plurality of memory devices while in the first mode at block 854, providing a plurality of actuator signals, including an output signal from each of the first plurality of memory devices, to control a flash memory array while in the first mode at block 856, activating a second mode in the memory device at block 858, writing at least one filter setting to a second plurality of memory devices while in the second mode at block 860, activating a third mode in the memory device at block 862, writing one or more filtered data bits to the first plurality of memory devices while in the third mode at block 864, and maintaining at least one signal level of the actuator signals as determined in the first mode while writing the one or more filtered data bits to the first plurality of memory devices in the third mode at block 866.

Method 850 may also include wherein writing one or more filtered data bits to the first plurality of memory devices includes determining whether a filter has been activated for a particular one of the first plurality of memory devices, and including in the filtered data bits a particular data bit to be written into the particular one of the first plurality of memory devices based on whether the filter has been active for the particular one of the first plurality of memory devices.

Method 850 may also include wherein writing a plurality of test data into the first plurality of memory devices includes generating the test data bits externally from the memory device. Method 850 may also include wherein writing the least one filter setting to the second plurality of memory devices includes generating the filter setting externally from the memory device. Method 850 may also include wherein writing one or more filtered data bits to the first plurality of memory devices includes generating a plurality of data bits using a memory controller embedded in the memory device, and filtering the generated one or more data bits based on the filter setting.

Figure 9:
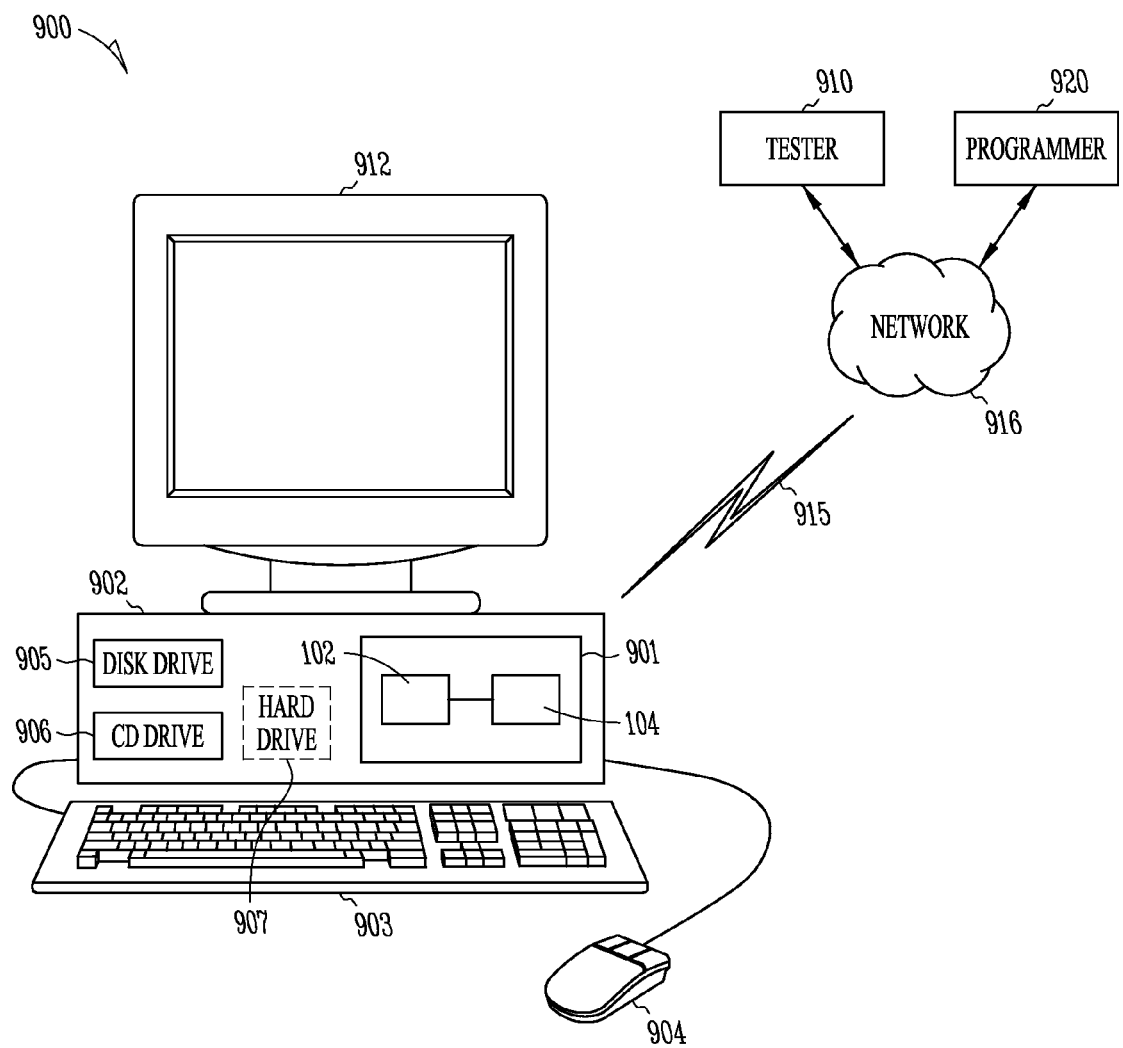
FIG. 9 illustrates an exemplary system incorporating one or more example embodiments register architectures.

FIG. 9 illustrates a system 900 that includes the register architecture of one or more embodiments of the present inventive subject matter. System 900 includes a register architecture, for example register architecture 100 as shown in FIG. 1, including a processor 102 and a memory device 104. In system 900, memory device 104 includes one or more enhanced registers used to control the operations of one or more memory arrays. Processor 102 and memory device 104 may be included on a single integrated circuit, such as integrated circuit 901.

In various embodiments, integrated circuit 901 is included in a computer, for example but not limited to computer 902. However, the device including memory device 104 is not limited to a particular device. Other devices including memory device 104 may include cell phones, personal digital assistants (PDA), televisions, and any other devices that include memory.

In various embodiments, computer 902 may include one or more input devices, such as keyboard 903 and mouse 904. Computer 902 may also include one or more devices for reading inputs from and providing outputs to a magnetic media such as a floppy disk, for example using disk drive 905. Computer 902 may also include one or more devices for inputting and outputting data to a compact disk, for example compact disk drive 906. Computer 902 may include one or more storage devices for storing data, for example but not limited to hard drive unit 907.

Computer 902 may be coupled to one or more output devices, for example but not limited to a display 912. Computer 902 may be linked by one or more networks, for example network 916. Network 916 is not limited to any particular type of network, and may include the Internet. Computer 902 may be linked to network 916 one or more type of links, such as but not limited to wireless link 915.

Tester 910 may be linked to computer 902. In various embodiments, tester 910 is coupled to computer 902 to supply one or more external signals as described above to memory device 104. In various embodiments, programmer 920 is linked to computer 902. In various embodiments, programmer 920 supplies one or more external signals to memory device 104 as described above.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

CONCLUSION

A register architecture used to generate actuator signals for controlling one or more memory arrays may operate in various modes, including but not limited to a user mode wherein the register architecture is controlled by a controller embedded in the memory chip, and a test mode wherein the register architecture and one or more memory arrays are controlled by external signals. In previous architectures, settings written into the register architecture during for example a test mode were not capable of being kept during execution of a subsequent user mode. The embodiments of the present invention provide a register architecture that allows one or more setting of actuator signals, set for example during a test mode, to be retained in a subsequent and different mode, for example a subsequent user mode. The determination as to which particular actuator signals are to retain a setting after exiting a mode providing those settings may be done on an individual actuator signal line by signal line basis, wherein the determination as to whether to retain a setting for a particular actuator signal line is completely independent of the determination as to whether to retain the setting for any other actuator signal line or lines.

What is claimed is:

1. An apparatus comprising:
   a switching circuit;
   a first memory device including a first input coupled to an output of the switching circuit to receive a first signal from the output of the switching circuit, the first memory device including a first output;
   a second memory device including a second input coupled to the output of the switching circuit to receive a second signal from the output of the switching circuit, second memory device including a second output;
   a memory array coupled to the first and second outputs to receive signals from the first and second memory devices, wherein the switching circuit includes an input coupled to at least one of the first and second outputs; and
   a decoder, the decoder including an input coupled to an additional output of the switching circuit and an output coupled to a second input of the first memory device and to a second input of the second memory device.

2. The apparatus of claim 1, wherein the switching circuit includes an input to receive an address signal.

3. The apparatus of claim 2, wherein the switch includes an additional input to receive a data signal.

4. The apparatus of claim 1, wherein the first memory device includes a flip-flop circuit having a flip-flop input coupled to the first input and a flip-flop output coupled to the first output.

5. The apparatus of claim 4, wherein the second memory device includes a flip-flop circuit having a flip-flop input coupled to the second input and a flip-flop output coupled to the second output.

6. An apparatus comprising:
   a switching circuit;
   a first memory device including a first input coupled to an output of the switching circuit to receive a first signal from the output of the switching circuit, the first memory device including a first output;
   a second memory device including a second input coupled to the output of the switching circuit to receive a second signal from the output of the switching circuit, second memory device including a second output;
   a memory array coupled to the first and second outputs to receive signals from the first and second memory devices, wherein the switching circuit includes an input coupled to at least one of the first and second outputs; and
   a logic circuit including an output coupled to a second input of the first memory device and to a second input of the second memory device; and
   a decoder including an input coupled to an additional output of the switching circuit and an output coupled to an input of the logic circuit.

7. An apparatus comprising:
   a first multiplexer including an input;
   a second multiplexer including an output coupled to the input of the first multiplexer;
   a first memory device including an input coupled to an output of the first multiplexer to receive a first signal from the output of the second multiplexer and an output coupled to an input of the second multiplexer;
   a second memory device including an input coupled to the output of the first multiplexer to receive a second signal from the output of the second multiplexer and an input coupled to a control input of the second multiplexer;
   a memory array coupled to the output of the first memory device; and
   a third memory device including an input coupled to the output of the first multiplexer and an output coupled to the memory array.

8. The apparatus of claim 7, further comprising a fourth memory device including an input coupled to the output of the first multiplexer and an output coupled to the control input of the second multiplexer.

9. An apparatus comprising:
   a first multiplexer including an input;
   a second multiplexer including an output coupled to the input of the first multiplexer;
   a first memory device including an input coupled to an output of the first multiplexer to receive a first signal from the output of the second multiplexer and an output coupled to an input of the second multiplexer;
   a second memory device including an input coupled to the output of the first multiplexer to receive a second signal from the output of the second multiplexer and an input coupled to a control input of the second multiplexer;
   a memory array coupled to the output of the first memory device; and
   a logic circuit including an output coupled to a second input of the first memory device; and
   a decoder including an output coupled to an input of the logic circuit.

10. The apparatus of claim 9, further comprising:
    a second logic circuit including an output coupled to a second input of the second memory device and an input coupled to the output of the decoder.

11. The apparatus of claim 10, wherein the first logic circuit includes an additional input to receive a first signal, and the second logic circuit includes an additional input to receive a second signal different from the first signal.

12. The apparatus of claim 11, wherein the decoder is configured to decode an address signal.

13. An apparatus comprising:
    a first multiplexer including an input;
    a second multiplexer including an output coupled to the input of the first multiplexer;
    a first memory device including an input coupled to an output of the first multiplexer to receive a first signal from the output of the second multiplexer and an output coupled to an input of the second multiplexer;
    a second memory device including an input coupled to the output of the first multiplexer to receive a second signal from the output of the second multiplexer and an input coupled to a control input of the second multiplexer;
    a memory array coupled to the output of the first memory device; and
    a third multiplexer including an input;
    a fourth multiplexer including an output coupled to the input of the third multiplexer;
    a third memory device including an input coupled to an output of the third multiplexer and an output coupled to an input of the fourth multiplexer; and
    a fourth memory device including an input coupled to the output of the third multiplexer and an input coupled to a control input of the fourth multiplexer.

14. An apparatus comprising:
a memory array;
a first group of registers configured to provide signals for controlling rows associated with the memory array; and
a second group of registers configured to provide signals for controlling columns associated with the memory array, wherein a first group of registers includes:
a first memory device including a first enable input, a first data input coupled to an output of a switching circuit to receive a first register data, and a first memory device output coupled to the memory array, and
a second memory device including a second enable input, a second data input coupled to the output of the switching circuit to receive a second register data, and a second memory device output coupled to the memory array, wherein the first group of registers further includes a third memory device including a third data input coupled to the output of the switching circuit and a third memory device output coupled to a control input of the switching circuit.

15. The apparatus of claim 14, wherein the first group of registers is configured to provide signals for controlling rows associated with the memory array.

16. The apparatus of claim 15, wherein the second group of registers is configured to provide signals for controlling columns associated with the memory array.

17. An apparatus comprising:
a memory array;
a first group of registers configured to provide signals for controlling rows associated with the memory array; and
a second group of registers configured to provide signals for controlling columns associated with the memory array, wherein a first group of registers includes:
a first memory device including a first enable input, a first data input coupled to an output of a switching circuit to receive a first register data, and a first memory device output coupled to the memory array, and
a second memory device including a second enable input, a second data input coupled to the output of the switching circuit to receive a second register data, and a second memory device output coupled to the memory array, wherein the switching circuit includes an input coupled to the first memory device output.

* * * * *

UNITED STATES PATENT AND TRADEMARK OFFICE
CERTIFICATE OF CORRECTION

| | | |
|---|---|---|
| PATENT NO. | : 8,275,926 B2 | Page 1 of 1 |
| APPLICATION NO. | : 13/093657 | |
| DATED | : September 25, 2012 | |
| INVENTOR(S) | : Giovanni Naso et al. | |

It is certified that error appears in the above-identified patent and that said Letters Patent is hereby corrected as shown below:

On the Title page, in field (74), in "Attorney, Agent, or Firm", in column 2, line 1, delete "Schwegmen," and insert -- Schwegman, --, therefor.

Signed and Sealed this
Twentieth Day of November, 2012

David J. Kappos
*Director of the United States Patent and Trademark Office*